United States Patent
Hayakawa

(10) Patent No.: US 10,810,446 B2
(45) Date of Patent: Oct. 20, 2020

(54) PARKING SPACE LINE DETECTION METHOD AND DEVICE

(71) Applicant: Nissan Motor Co., Ltd., Yokohama-shi, Kanagawa (JP)

(72) Inventor: Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 93 days.

(21) Appl. No.: 15/769,267

(22) PCT Filed: Oct. 22, 2015

(86) PCT No.: PCT/JP2015/079893
§ 371 (c)(1),
(2) Date: Apr. 18, 2018

(87) PCT Pub. No.: WO2017/068699
PCT Pub. Date: Apr. 27, 2017

(65) Prior Publication Data
US 2018/0307919 A1   Oct. 25, 2018

(51) Int. Cl.
*G06T 7/60* (2017.01)
*G06T 7/136* (2017.01)
(Continued)

(52) U.S. Cl.
CPC ........ *G06K 9/00798* (2013.01); *B60R 21/00* (2013.01); *G06T 7/12* (2017.01); *G06T 7/136* (2017.01); *G06T 7/60* (2013.01); *B60W 30/06* (2013.01); *B60W 2420/42* (2013.01); *G06T 2207/30256* (2013.01)

(58) Field of Classification Search
CPC ........ G06K 9/00798; G06K 9/00791; G06K 9/00805; G06K 9/00812; G06K 9/00818; G06K 9/00825; G06K 9/00711; G06K 9/00744; G06K 9/00771; G06T 7/13; G06T 7/136; G06T 7/143; G06T 7/162;
(Continued)

(56) References Cited

U.S. PATENT DOCUMENTS

| | | | |
|---|---|---|---|
| 2013/0021171 A1* | 1/2013 | Hsu | G06K 9/00812 340/932.2 |
| 2014/0153776 A1* | 6/2014 | Takeuchi | G06K 9/3241 382/103 |

(Continued)

FOREIGN PATENT DOCUMENTS

| | | |
|---|---|---|
| EP | 2927077 A1 | 10/2015 |
| JP | 2010224926 A | 10/2010 |

(Continued)

*Primary Examiner* — Dwayne D Bost
*Assistant Examiner* — Stephen M Brinich
(74) *Attorney, Agent, or Firm* — Young Basile Hanlon & MacFarlane, P.C.

(57) ABSTRACT

A method of detecting a frame line of a parking space from a captured image acquired by a camera includes detecting the frame line when the value of a parameter used for detection of the frame line falls within a first threshold range, estimating the position of an undetected frame line on the basis of the position of the detected frame line, and setting a threshold range used for detecting the frame line at the estimated position of the frame line to a second threshold range wider than the first threshold range.

6 Claims, 19 Drawing Sheets

(51) Int. Cl.
*G06T 7/12* (2017.01)
*B60W 30/06* (2006.01)
*G06K 9/00* (2006.01)
*B60R 21/00* (2006.01)

(58) Field of Classification Search
CPC ......... G06T 7/181; G06T 7/187; G06T 7/194;
G06T 7/12; G06T 7/11; G06T 7/10
USPC ........ 382/199, 195, 256, 100, 103–104, 106
See application file for complete search history.

(56) References Cited

U.S. PATENT DOCUMENTS

| | | | |
|---|---|---|---|
| 2015/0294163 | A1 | 10/2015 | Sakamoto |
| 2015/0317526 | A1* | 11/2015 | Muramatsu ........ G06K 9/00812 348/148 |
| 2016/0039409 | A1 | 2/2016 | Hayakawa et al. |
| 2016/0078764 | A1* | 3/2016 | Kiyokawa ............. G01S 15/931 701/301 |
| 2016/0114795 | A1* | 4/2016 | Kiyokawa ............. B60W 30/06 342/55 |
| 2018/0099661 | A1* | 4/2018 | Bae ........................ G08G 1/146 |

FOREIGN PATENT DOCUMENTS

| | | |
|---|---|---|
| JP | 2011191884 A | 9/2011 |
| JP | 2015064795 A | 4/2015 |

* cited by examiner

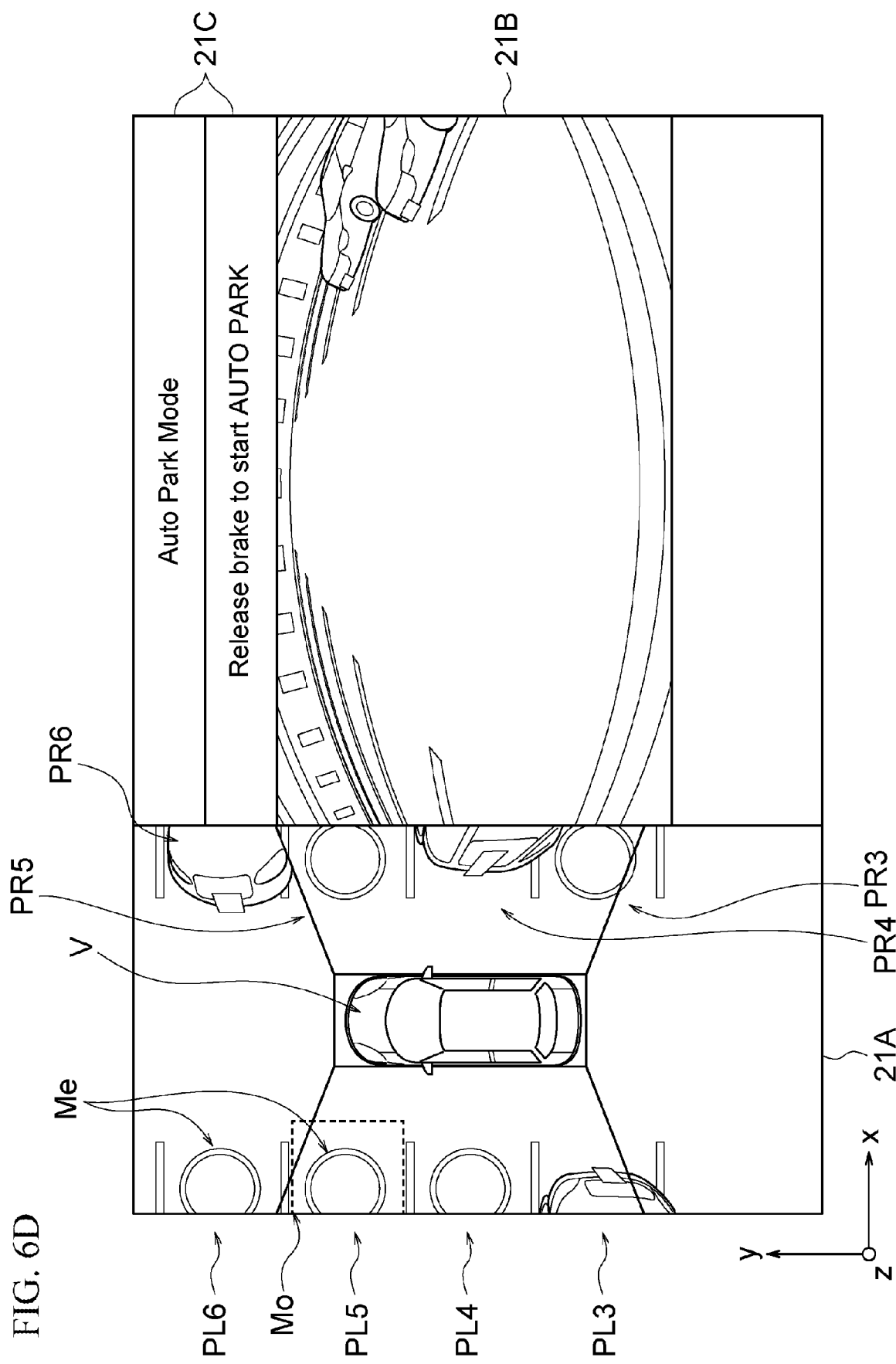

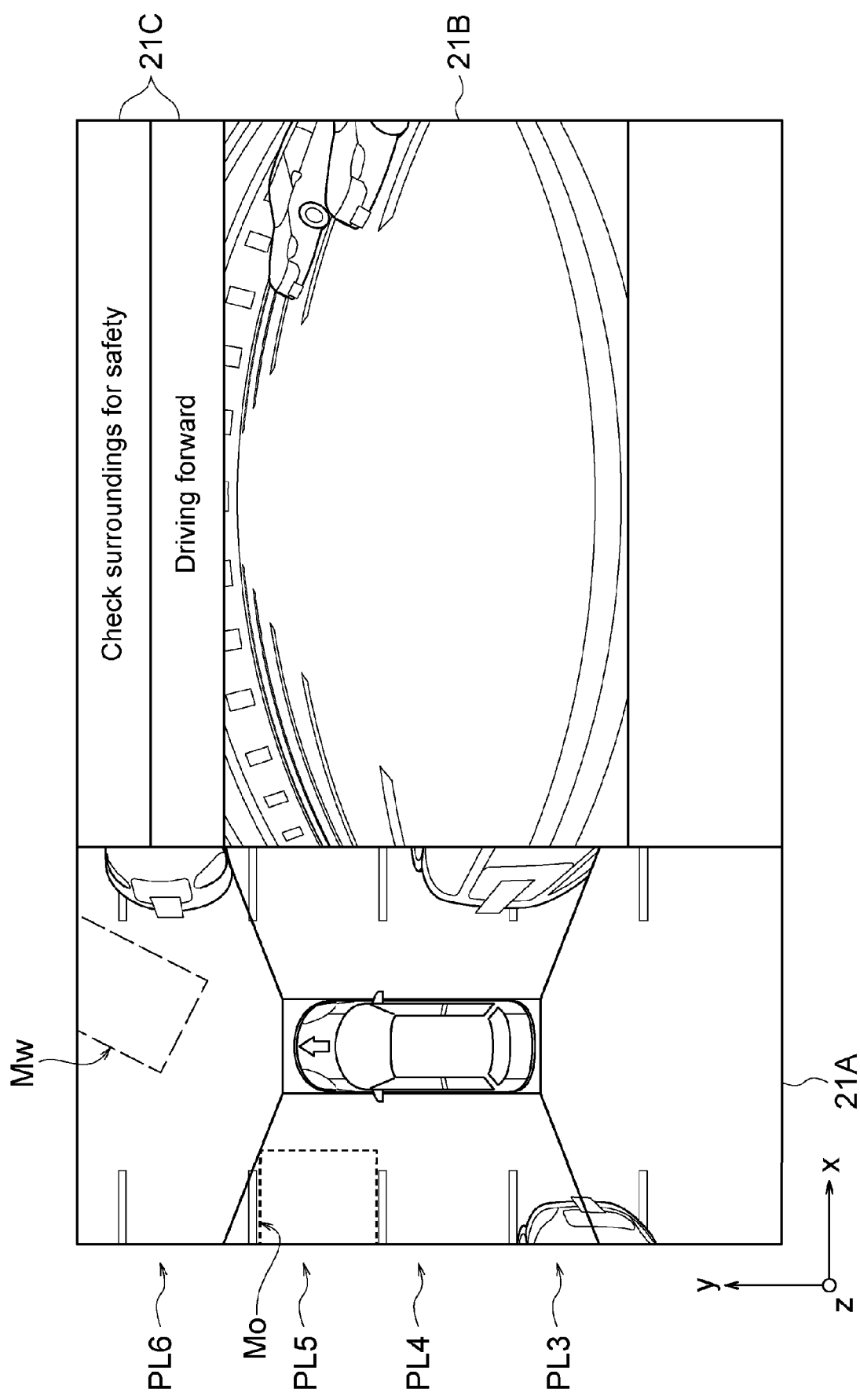

PARKING SPACE LINE DETECTION METHOD AND DEVICE

TECHNICAL FIELD

The present invention relates to a method and device for detecting a frame line of a parking space.

BACKGROUND

A device for detecting edges of a white line of a parking space is known. In this device, when a first pixel of which the luminance difference with the adjacent pixel is a threshold or more exists and a second pixel of which the luminance difference with the adjacent pixel is the threshold or more exists at a position separate from the first pixel by a distance corresponding to the width of a white line, the first pixel or the second pixel is employed as representing an edge of the white line (see Japanese Patent Application JP2011-191884A).

When edges of a white line are detected on the basis of an image captured by an image capture device provided in a subject vehicle, the farther from the subject vehicle the position to be detected, the lower the resolution of the white line of the parking space. Thus, a problem is that the detection accuracy of a white line is poor.

SUMMARY

A problem to be solved by the present invention is to provide a method and device for detecting a frame line of a parking space with which the detection accuracy of the frame line of the parking space can be ensured regardless of the resolution of the captured image.

In the present invention, when the value of a parameter used for detection of a frame line falls within a first threshold range, the frame line is detected and the position of an undetected frame line is estimated on the basis of the position of the detected frame line. The present invention solves the above problem by setting a threshold range of the value of the parameter, which is used for detecting the frame line at the estimated position of the frame line, to a second threshold range wider than the first threshold range.

According to the present invention, the threshold range of the value of the parameter, which is used for detecting the frame line, is set in accordance with the distance from the subject vehicle, and an effect can therefore be obtained that the possibility that the frame line of the parking space can be detected increases.

BRIEF DESCRIPTION OF THE DRAWINGS

FIG. 6D is a fourth view for describing an example of a display screen in the parking assist process according to one or more embodiments of the present invention;

FIG. 6E is a view for describing an example of a display screen in the parking assist process according to one or more embodiments of the present invention;

DETAILED DESCRIPTION OF THE EMBODIMENTS

Figure 1:
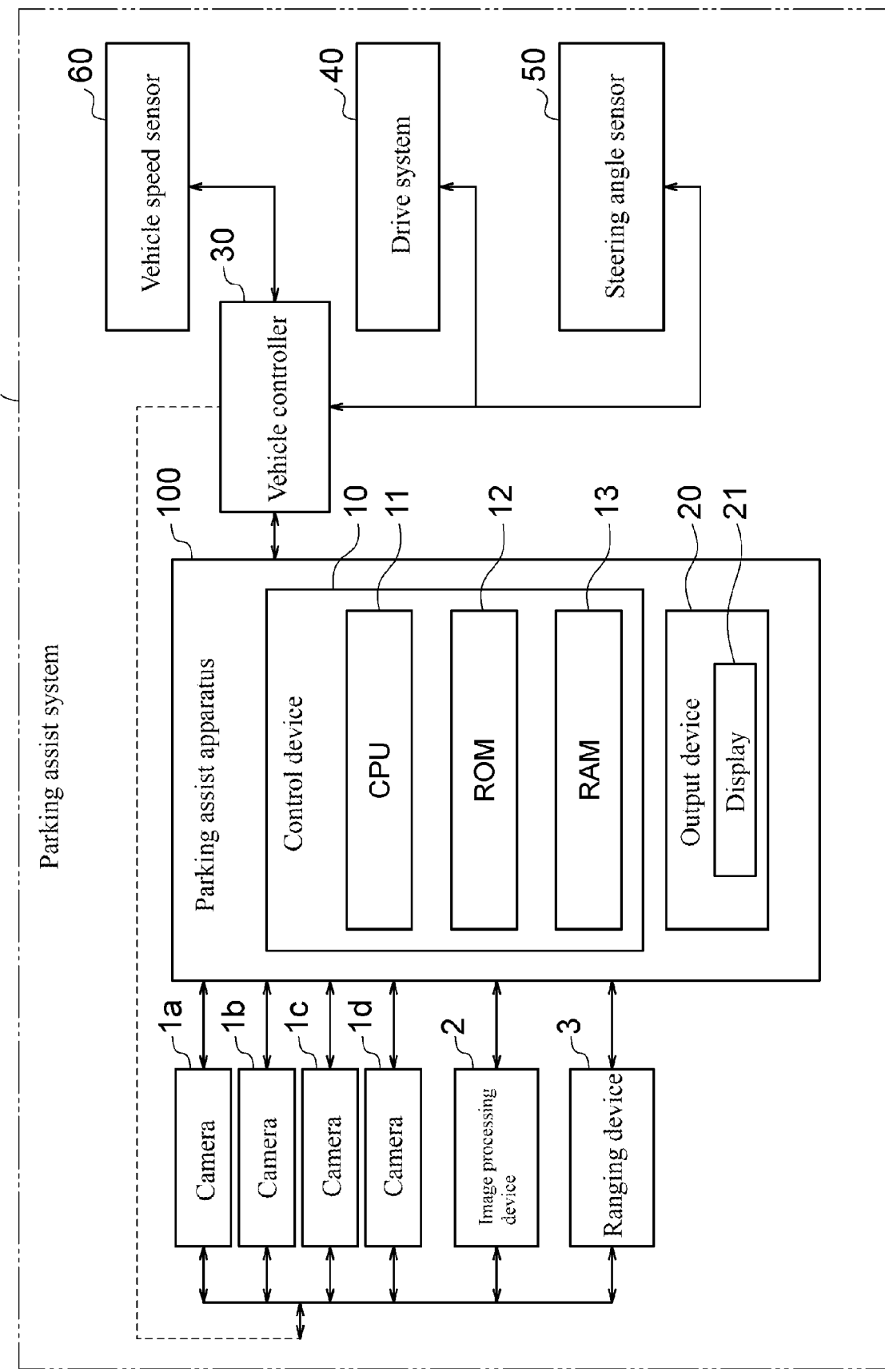
FIG. 1 is a block diagram illustrating an example of a parking assist system according to one or more embodiments of the present invention.

FIG. 1 is a block diagram of a parking assist system 1000 having a parking assist apparatus 100 according to one or more embodiments of the present invention. The parking assist system 1000 according to one or more embodiments of the present invention assists an operation of moving (parking) a subject vehicle into a parking space. The parking assist system 1000 according to one or more embodiments of the present invention includes cameras 1*a* to 1*d*, an image processing device 2, a ranging device 3, the parking assist apparatus 100, a vehicle controller 30, a drive system 40, a steering angle sensor 50, and a vehicle speed sensor 60. The parking assist apparatus 100 according to one or more embodiments of the present invention includes a control device 10 and an output device 20. The output device 20 includes a display 21, a speaker 22, and a lamp 23. These components are connected to one another via a controller area network (CAN) or other in-vehicle LAN to mutually exchange information.

The control device 10 of the parking assist apparatus 100 according to one or more embodiments of the present invention is a specific computer comprising a ROM 12 that stores a parking assist program, a CPU as an operation circuit that executes the program stored in the ROM 12 to serve as the parking assist apparatus 100 according to one or more embodiments of the present invention, and a RAM 13 that serves as an accessible storage device.

The parking assist program according to one or more embodiments of the present invention is a program for execution of a control procedure of presenting parking spaces, into which parking is possible, on the display 21 and assisting an operation to park the subject vehicle into a parking space set by the user as the parking target space. The parking assist program according to one or more embodiments of the present invention can be applied to automated parking in which the steering, accelerator, and brake are operated to automatically park a vehicle and can also be applied to semiautomated parking in which at least one operation of the steering, accelerator, and brake is manually performed and other operations are automatically performed for parking. In addition or alternatively, the parking assist program can be applied to a function with which a travel route to a parking space is presented and the parking is assisted by guidance to the parking space.

The control device 10 of the parking assist apparatus 100 according to one or more embodiments of the present invention has functions of executing an information acquisition process, an available parking space detection process, a recommended available parking space detection process, and a display control process. Each of the above processes is executed by cooperation of software for implementing the process and the above-described hardware.

Figure 2:
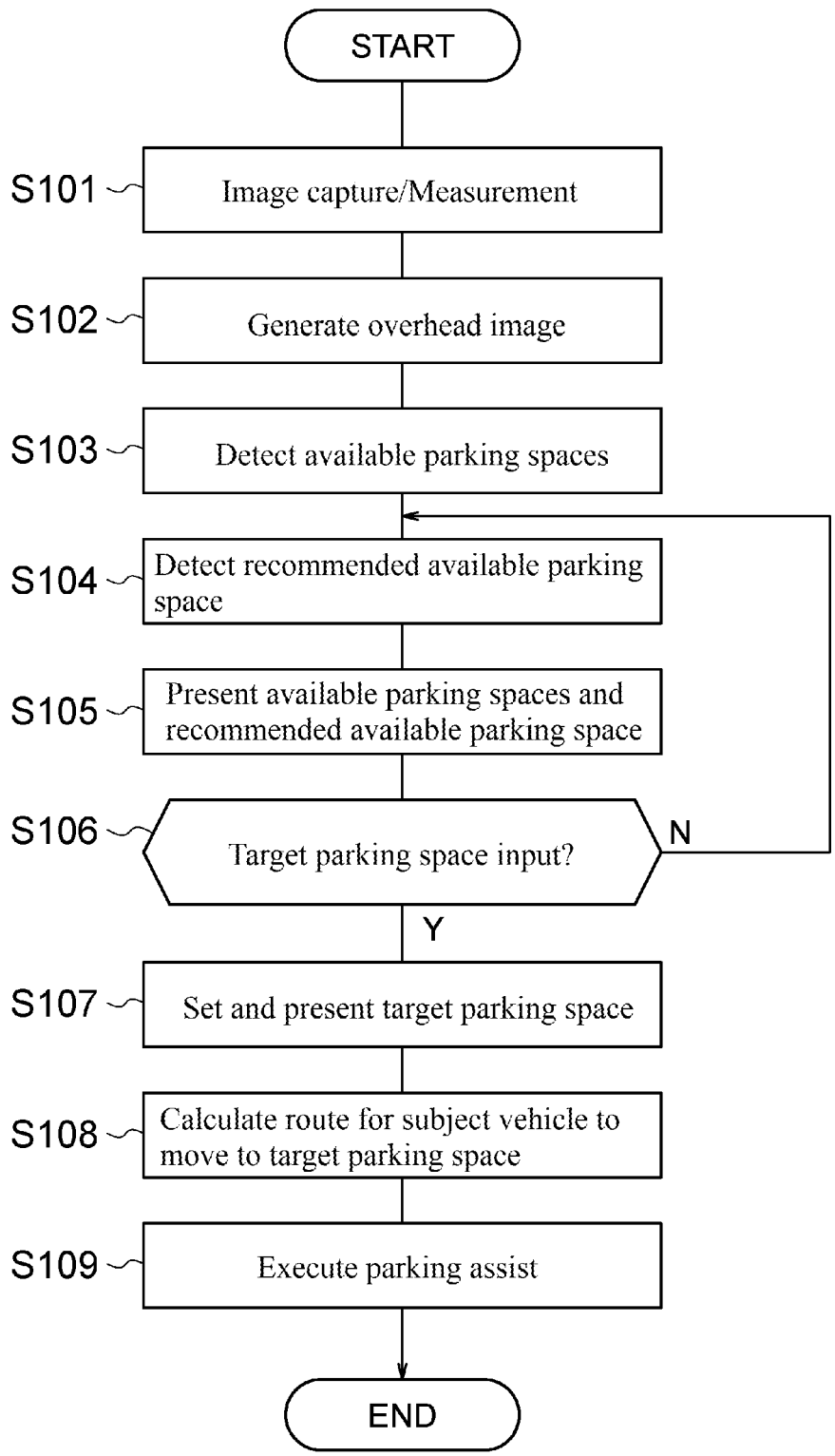
FIG. 2 is a flowchart illustrating an example of a control procedure in the parking assist system according to one or more embodiments of the present invention.

FIG. 2 is a flowchart illustrating a control procedure of the parking assist process executed by the parking assist system 1000 according to one or more embodiments of the present invention. The trigger for starting the parking assist process is not particularly limited, and the parking assist process may be triggered by the operation of a start switch of the parking assist apparatus 100.

The parking assist apparatus 100 according to one or more embodiments of the present invention has a function for automatically moving the subject vehicle to a parking space. In this process, one or more embodiments of the present invention use a switch that operates only while being turned on, such as a deadman switch. In the parking assist apparatus 100, the automated driving of the subject vehicle is executed when the deadman switch is pressed and the automated driving of the subject vehicle is suspended when the pressing of the deadman switch is released.

Specifically, in step S101, the control device 10 of the parking assist apparatus 100 according to one or more embodiments of the present invention acquires images captured by the cameras 1a to 1d attached to multiple sites of the subject vehicle. The cameras 1a to 1d capture images of boundary lines of parking spaces around the subject vehicle and objects existing around the parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects correspond to obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

Figure 3:
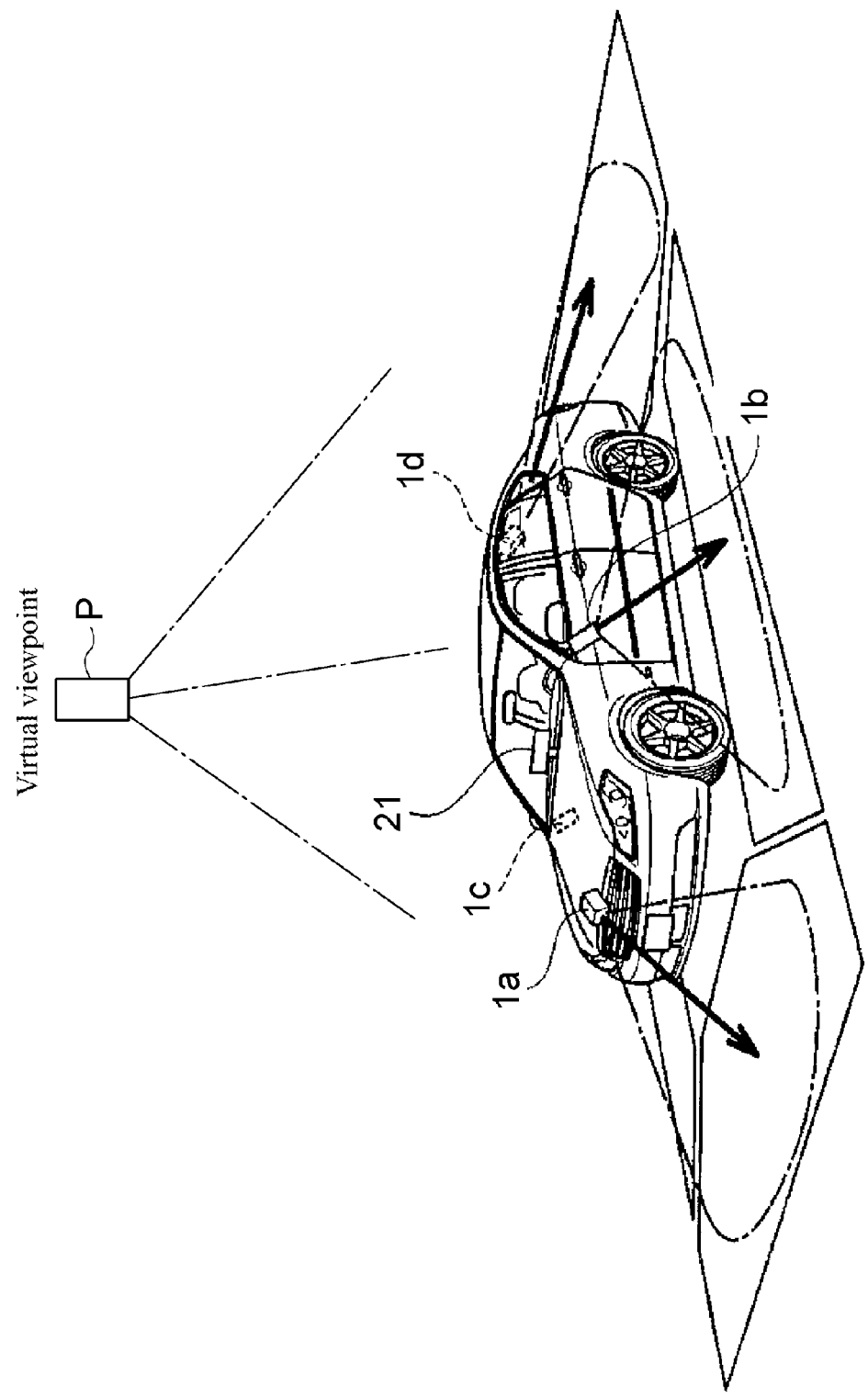
FIG. 3 is a view illustrating an example of positions at which on-board cameras are arranged according to one or more embodiments of the present invention.

FIG. 3 is a view illustrating an exemplary arrangement of the cameras 1a to 1d disposed on the subject vehicle. In the example illustrated in FIG. 3, the camera 1a is disposed on the front grille part of the subject vehicle, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step S101, the control device 10 also acquires ranging signals from the ranging device 3, which may be a plurality of modules attached to multiple sites of the subject vehicle.

In step S102, the control device 10 of the parking assist apparatus 100 controls the image processing device 2 to generate an overhead image. The image processing device 2 generates the overhead image on the basis of the acquired plurality of captured images. The overhead image is an image in which the surrounding state including the subject vehicle and the parking space for the subject vehicle to park is viewed from a virtual viewpoint P (see FIG. 3) above the subject vehicle. The image processing performed by the image processing device 2 may be conducted, for example, using a method as disclosed in "Development of Around View System, Proceedings of Society of JSAE Annual Congress, 116-07 (Oct. 2007), pp. 17-22, SUZUKI Masayasu, CHINOMI Satoshi, TAKANO Teruhisa." Examples of a generated overhead image 21A are illustrated in FIGS. 6A to 6E, which will be described later. These figures each illustrate a display example that simultaneously displays the overhead image (top view) 21A around the subject vehicle and a monitoring image (normal view) 21B around the subject vehicle.

Referring again to FIG. 2, in step S103, available parking spaces Me are detected. The available parking spaces Me are parking spaces into which the subject vehicle can be parked. The control device 10 detects the available parking spaces Me on the basis of the images captured by the cameras 1a to 1d and/or the ranging signals from the ranging device 3. In the above description, the available parking spaces Me are detected from the images captured by the on-board cameras, but the present invention is not limited to this, and necessary information may be acquired from an external server to specify the available parking spaces.

A method of detecting the available parking spaces Me will be described below. The control device 10 determines whether or not the subject vehicle is traveling in an area that includes parking spaces (such an area will also be referred to as a "parking area," hereinafter), on the basis of the vehicle speed, positional information of a navigation system, etc. For example, when the vehicle speed of the subject vehicle is a predetermined vehicle speed threshold or less and this state continues for a predetermined time or more, the control device 10 determines that the subject vehicle is traveling in a parking area. In addition or alternatively, the control device 10 specifies, for example, parking spaces of a highway or the like from the positional information of the navigation system thereby to determine that the subject vehicle is traveling in a parking area. In one or more embodiments of the present invention, a determination may be made as to whether or not the detected area is an area including parking spaces, via communication with the outside of the vehicle, such as so-called road-to-vehicle communication and vehicle-to-vehicle communication.

When a determination is made that the subject vehicle is traveling in a parking area, the control device 10 detects frame lines on the basis of the overhead image generated by the image processing device 2. Frame lines are boundary lines that define frames (regions) of parking spaces. The control device 10 performs edge detection on the captured images. In the edge detection, the control device 10 detects a pixel array in which the luminance difference between each pixel and its adjacent pixel is a predetermined value or more from the overhead image. Then, when the length of the detected pixel array is a predetermined threshold or more, the control device 10 detects a line of which the edge is defined by the pixel array, as a frame line. The control device 10 also detects whether or not there is a line that has a higher possibility of being a frame line than the detected frame line, around the portion detected as the frame line. For example, when a line having a larger luminance difference is newly detected, the newly detected line is detected as a line having a higher possibility of being a frame line. In one or more embodiments of the present invention, color of frame lines is white, but the present invention is not limited to this, and other colors such as red may also be employed.

Figure 7C:
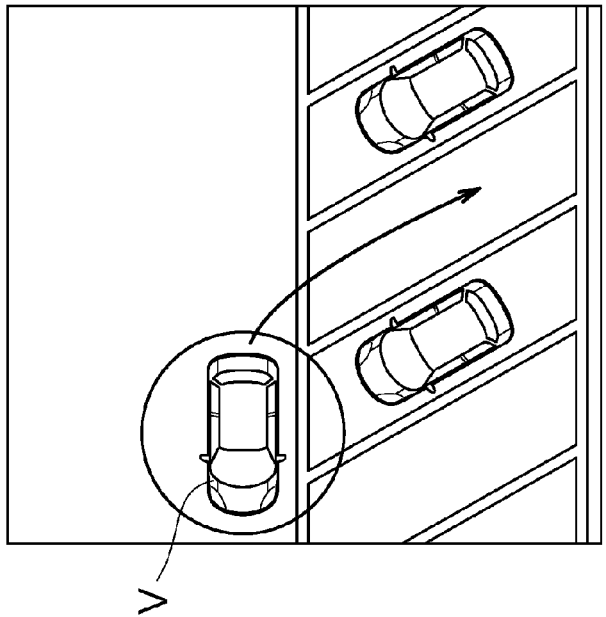
FIGS. 7A-7C are a set of views illustrating examples of parking patterns to which the parking assist process according to one or more embodiments of the present invention is applied.
Figure 7B:
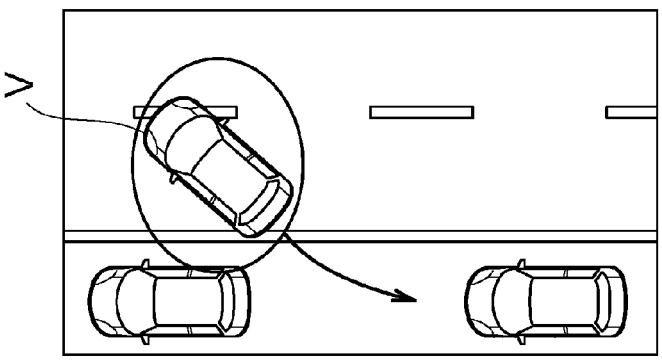
Figure 7A:
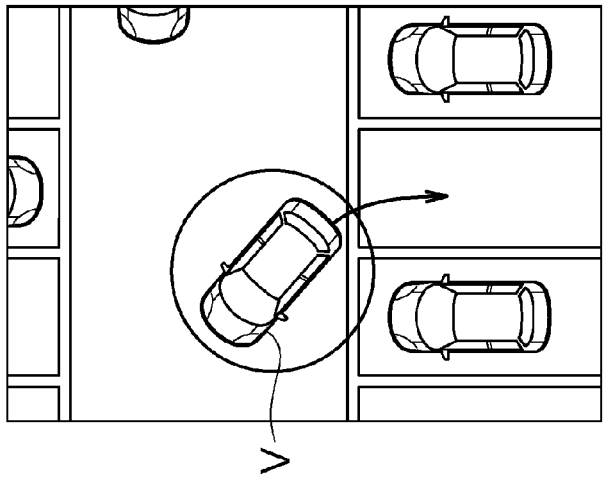

The ROM 12 of the control device 10 preliminarily stores information on the patterns of parking frames. Examples of the patterns of parking frames include those in a right-angle parking scheme as illustrated in FIG. 7A, which will be described later, those in a parallel parking as illustrated in FIG. 7B, which will be described later, and those in an angle parking scheme as illustrated in FIG. 7C, which will be described later.

When the candidate of a frame line detected from the overhead image satisfies the following three conditions, the control device 10 detects the candidate of a frame line as a frame line and detects a space defined by the frame line as a parking space. The first condition is that the distance from the candidate of another frame line or a detected frame line falls within a predetermined threshold range (e.g. an actual distance of 2 to 2.5 [m]). The second condition is that the relative angle with the candidate of another frame line or a detected frame line falls within a predetermined threshold range (e.g. −10° to +10°). The third condition is that lines extracted as candidates of parking frame lines do not include a line having a length equal to or smaller than a first line length threshold that is preliminarily set (e.g. a length corresponding to an actual distance of 15 [m]). In the above description, when the three conditions are satisfied, a white line is detected, but the present invention is not limited to this. In an alternative embodiment, when any combination of the conditions is satisfied or when at least one condition is satisfied, a white line may be detected.

When parking spaces that satisfy the above three conditions are specified, the control device 10 determines whether or not obstacles are present in the specified parking spaces using the detection data from the ranging device 3. In addition, the control device 10 determines whether or not the specified parking spaces are those into which parking is possible by automated driving, on the basis of a travel route of the automated driving. For example, parking spaces for which a travel route of the automated driving cannot be ensured, such as parking spaces facing a wall, do not correspond to parking spaces into which parking is possible by the automated driving. Then, the control device 10 sets parking spaces, among the specified parking spaces, in which no obstacles exist and into which parking is possible by the automated driving, as the available parking spaces Me. Thus, the control device 10 detects the available parking spaces Me. In the above description, parking spaces of which the parking frame lines are detected are detected as the available parking spaces Me, but in one or more embodiments of the present invention, the detection scheme is not limited to the above. In addition or alternatively, even if parking frame lines cannot be detected, parking spaces satisfying a predetermined condition may be detected as the available parking spaces Me, such as when empty spaces having a certain region are detected and when parking spaces were used for parking in past times.

Figure 4A:
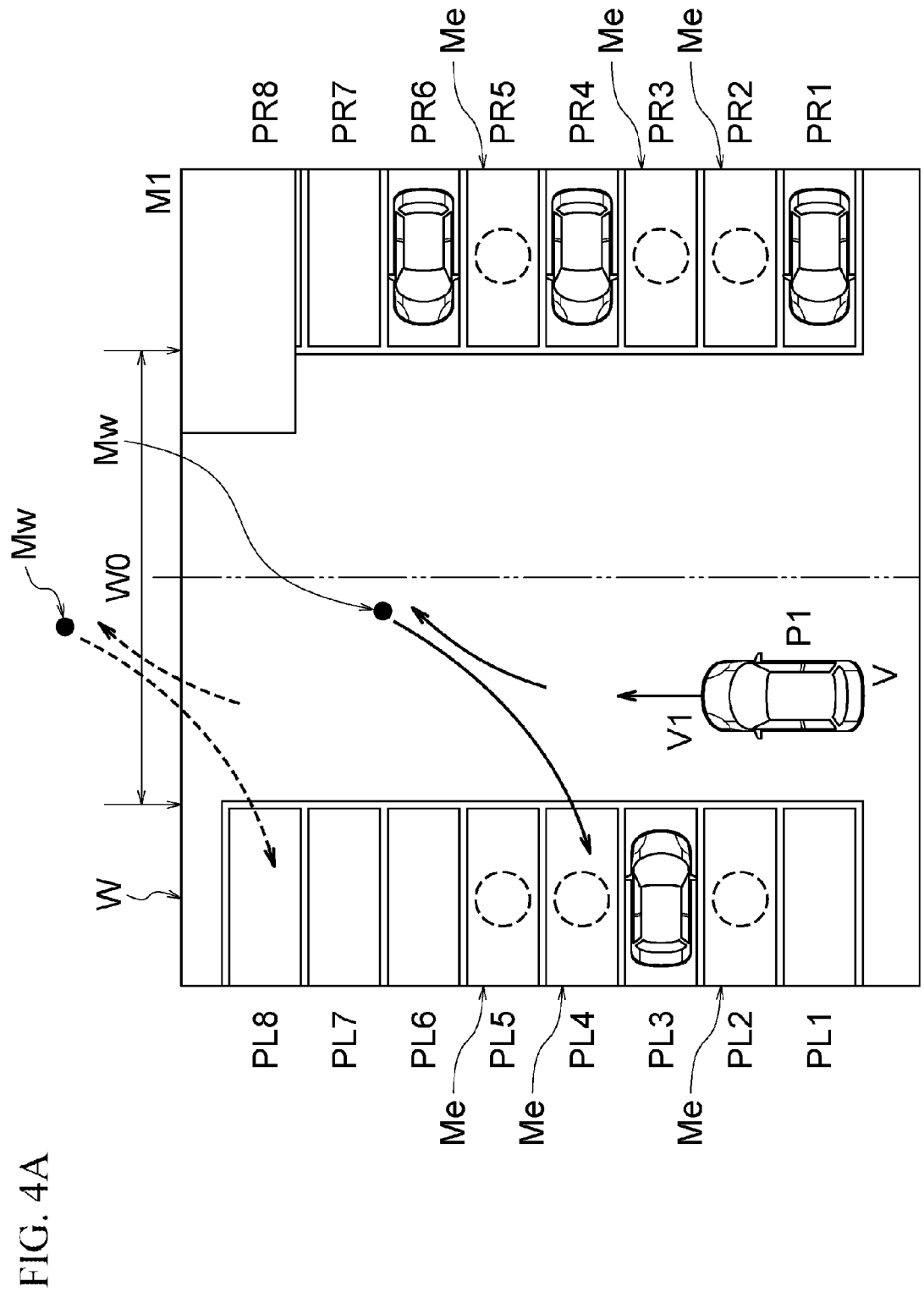
FIG. 4A is a first view for describing an example of a parking assist process according to one or more embodiments of the present invention.

FIG. 4A is a first view for describing an example of the parking assist process according to one or more embodiments of the present invention. In FIG. 4A, arrows represent a travel route when the vehicle is parked by automated driving. Dotted circles represent the available parking spaces Me detected at the position P1. In the parking area illustrated in FIG. 4A, an obstacle M1 exists on the parking space PR8, and the control device 10 therefore does not specify the parking space PR8 as an available parking space Me. With regard to the parking space PL8, a travel route cannot be ensured in the automated driving because a wall W interferes with the travel route (corresponding to dotted arrows in FIG. 4A), and the parking space PL8 is therefore not a parking space suitable for the automated driving. Accordingly, the control device 10 does not specify the parking space PL8 as an available parking space Me. Parked vehicles exist in the parking spaces PR1, PR4, PR6, and PL3, and the control device 10 therefore does not specify them as available parking spaces Me. The control device 10 specifies the parking spaces PL1, PL2, PL4 to PL7, PR2, PR3, PR5, and PR7 as available parking spaces Me.

As illustrated in FIG. 4A, the position of the subject vehicle traveling is P1 and the vehicle speed is V1. The control apparatus 10 sets a range that includes the parking spaces PL2 to PL5 and PR2 to PR5, among the parking spaces included in the images captured at the position P1 of the subject vehicle V, as the detection range for available parking spaces Me. The detection range for available parking spaces Me during the vehicle's travel is not limited to the range of parking spaces PL2 to PL5 and PR2 to PR5, and may also be the range of parking spaces PL1 to PL8 and PR1 to PR8, for example. In FIG. 4A and in FIGS. 4B to 4D which will be described later, the movement of the subject vehicle V is represented in a temporal sequence, and the position of the subject vehicle V moves in the order of FIG. 4A, FIG. 4B, FIG. 4C, and FIG. 4D. The state of the subject vehicle V illustrated in FIG. 4E, which will be described later, is not included in the temporal sequence expressed in FIGS. 4A to 4D.

Referring again to FIG. 2, in step S104, a recommended available parking space Mr is detected. The recommended available parking space Mr is an available parking space suitable for parking the subject vehicle. The control device 10 detects the recommended available parking space Mr in accordance with the traveling state of the subject vehicle from among the detected plurality of available parking spaces.

A method of detecting the recommended available parking space Mr will be described below. The control device 10 calculates the travel route when parking into each of the available parking spaces Me. The travel route to be calculated is a route from the start position of the automated driving to the position of an available parking space Me. The control device 10 specifies the start position of the automated driving for each of the available parking spaces Me. The control device 10 sets the travel route of the automated driving for the start position of the automated driving. The travel route of the automated driving is not limited to being one. The control device 10 sets an appropriate travel route in accordance with the surrounding situations when performing the automated driving. The route to be calculated is a travel route when the subject vehicle moves on the travel route from the start position of the automated driving and arrives at the position of the available parking space Me (position at which the parking is completed).

The travel route is different for each available parking space Me in accordance with the number of turns for parking, the travel distance, the maximum steering angle, etc. When the vehicle travels along a travel route by the automated driving, therefore, the required time for parking is different for each available parking space Me. For example, the required time for parking will be shorter as the number of turns for parking is smaller, as the distance of a travel route is shorter, or as the maximum steering angle is smaller. As illustrated in FIG. 4A, on the assumption of parking into the available parking space PL6 or PL7, the distance from the vicinity of the parking space PL7 to the wall Wa is shorter than the distance from the vicinity of the parking space PL6 to the wall W. The number of turns for parking when parking into the parking space PL7 is therefore larger than the number of turns for parking when parking into the parking space PL6, and the required time for parking into the parking space PL7 is longer than the required time for parking into the parking space PL6.

The control device 10 then calculates a gaze point distance on the basis of the vehicle speed of the subject vehicle V. The gaze point distance corresponds to a distance from the position of the subject vehicle V to the position which the driver of the subject vehicle V gazes on. The higher the vehicle speed, the farther the driver gazes on. Thus, the higher the vehicle speed, the longer the gaze point distance. The gaze point distance may be the length of a straight line directing ahead of the subject vehicle V. The line corresponding to the gaze point distance does not have to be a straight line and may also be defined along a curve. When the gaze point distance is defined along a curve, the curvature of the curve may be associated with the steering angle.

Figure 5:
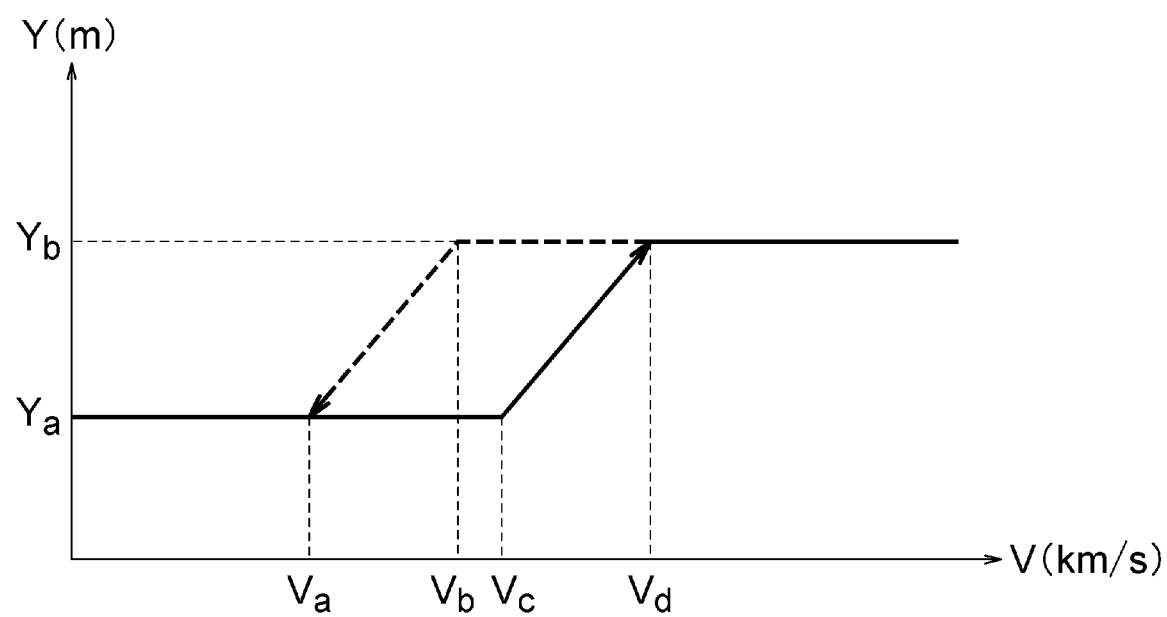
FIG. 5 is a graph illustrating the relationship between a vehicle speed (V [km/s]) and a gaze point distance (Y [m])

FIG. 5 is a graph illustrating the relationship between the vehicle speed (V [km/s]) and the gaze point distance (Y [m]). The solid line represents a characteristic when the vehicle speed increases while the broken line represents a characteristic when the vehicle speed decreases. As illustrated in FIG. 5, when the vehicle speed is Va or lower, the gaze point distance is Ya. When the vehicle speed increases from Va to Vc, the gaze point distance maintains Ya. Then, as the vehicle speed increases from the state of Vc, the gaze point distance increases in proportion to the vehicle speed within a range of Vc or higher and Vd or lower of the vehicle speed. When the vehicle speed is Vd or higher, the gaze point distance maintains Yb. On the other hand, when the vehicle speed lowers from the state of Vd, the gaze point distance maintains Yb until the vehicle speed returns to Vb from Vd. The gaze point distance decreases in proportion to the vehicle speed within a range of Va or higher and Vc or lower of the vehicle speed. Thus, the characteristic representing the relationship between the vehicle speed and the gaze point distance is a hysteresis characteristic between the increasing direction and decreasing direction of the vehicle speed.

The ROM 12 of the control device 10 stores the relationship between the vehicle speed and the gaze point distance as a map. When acquiring the information on the vehicle speed from the vehicle speed sensor 60, the control device 10 refers to the map to calculate the gaze point distance corresponding to the vehicle speed.

Figure 4B:
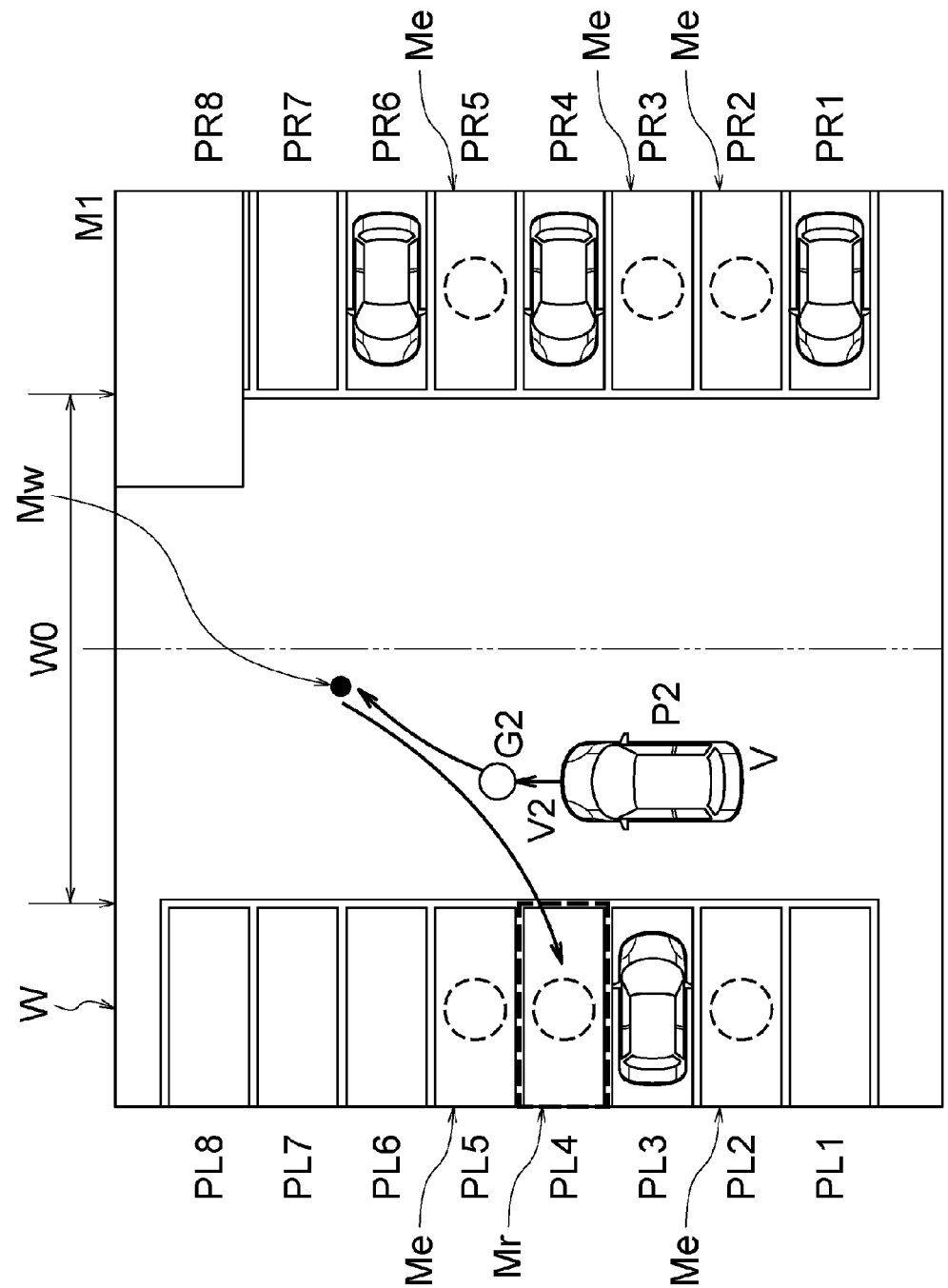
FIG. 4B is a second view for describing an example of the parking assist process according to one or more embodiments of the present invention.

FIG. 4B is a second view for describing an example of the parking assist process according to one or more embodiments of the present invention. In FIG. 4B, the position of the subject vehicle traveling is P2 and the vehicle speed is V2. The control device 10 calculates the gaze point distance corresponding to the vehicle speed V2. The control device 10 sets a position separate from the position P2 by the gaze point distance as a gaze point G2.

The control device 10 then assigns numbers for identification to the available parking spaces Me in the vicinity of the gaze point G2. For example, the numbers are given in the order of proximity to the gaze point G2. The control device 10 calculates the ease of entry into each available parking space Me. The index of the ease of entry into an available parking space Me is a travel time for the subject vehicle V to be parked into the available parking space Me by the automated driving and corresponds to the required time for parking. The required time for parking is a time when traveling by the automated driving along the travel route calculated for each available parking space Me. The ease of entry into an available parking space Me is therefore determined in accordance with the travel distance, the number of operations (the number of turns for parking), the maximum steering angle, the vehicle speed, etc. The index of the ease of entry into an available parking space Me may include not only the required time for parking but also other factors such as the certainty of parking in the automated driving. The control device 10 calculates the required time for parking into each available parking space Me. In the example of FIG. 4B, the control device 10 calculates the required time for parking into each of the available parking spaces PL2, PL4, PL5, PR2, PR3, and PR5.

The control device 10 compares the required time for parking into each available parking space Me with a predetermined required time threshold. The required time threshold is a value that is preliminarily set and an upper limit of the required time when parking by the automated driving. When the required time for parking into an available parking space Me is longer than the required time threshold, the control device 10 does not specify the available parking space Me as the recommended available parking space Mr.

After specifying the available parking spaces Me with which the required time for parking is shorter than the required time threshold, the control device 10 sets an available parking space Me that is closest to the gaze point among the specified available parking spaces Me as the recommended available parking space Mr. In the example of FIG. 4B, the required time for parking into the parking space PL4 is shorter than the required time threshold, and the parking space PL4 is located closest to the gaze point. The control device 10 therefore sets the parking space PL4 as the recommended available parking space Mr. In one or more embodiments of the present invention, an available parking space Me with which the required time for parking is shortest may be detected as the recommended available parking space.

Referring again to FIG. 2, in step 105, the available parking spaces Me and the recommended available parking space Mr are presented. The control device 10 controls the display 21 to display the set available parking spaces Me and the set recommended available parking space Mr thereby to present them to the driver and passengers.

Figure 6A:
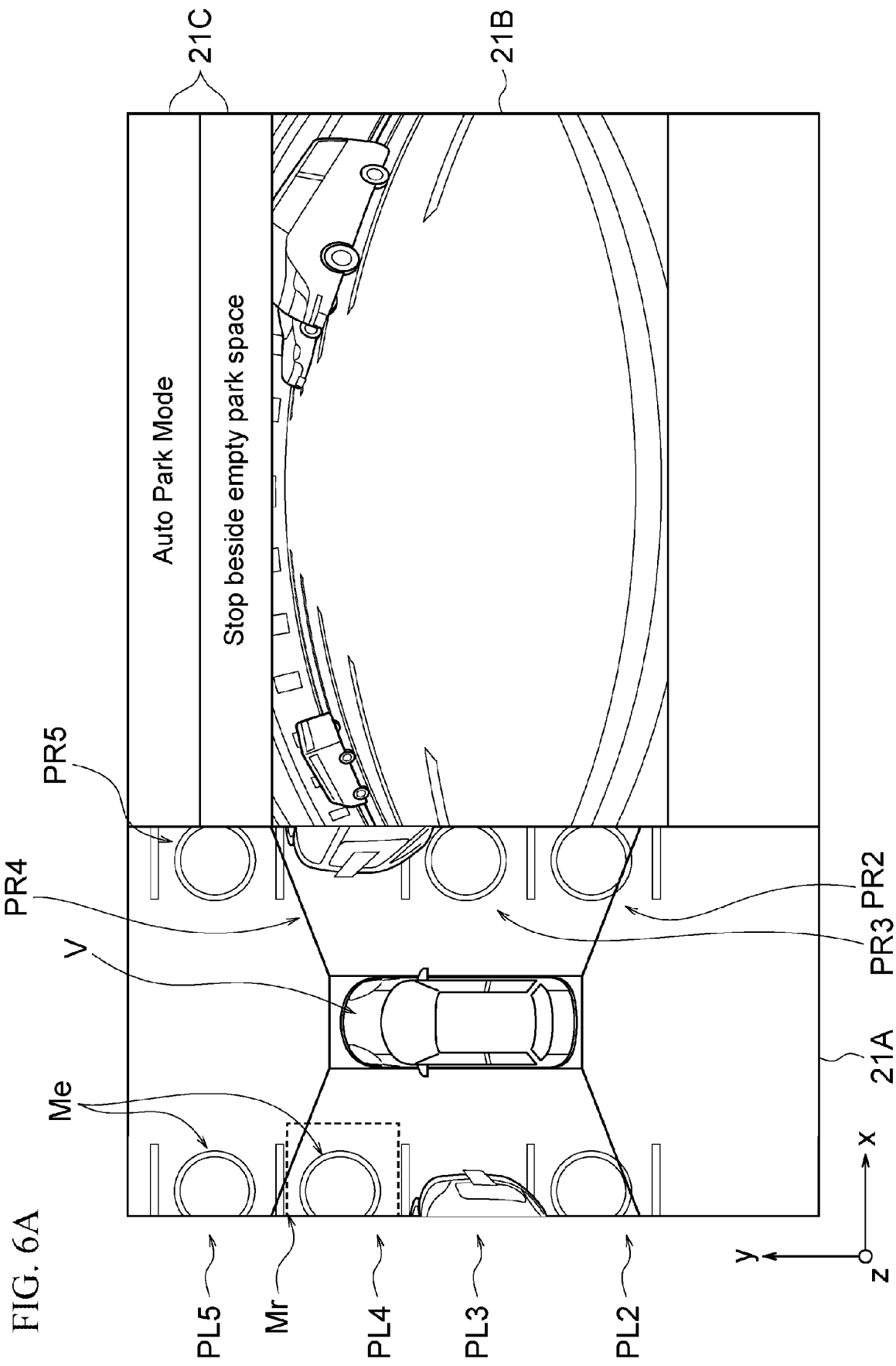
FIG. 6A is a first view for describing an example of a display screen in the parking assist process according to one or more embodiments of the present invention.

FIG. 6A is a first view for describing an example of a display screen in the parking assist process according to one or more embodiments of the present invention. The display screen of FIG. 6A is a display screen when the subject vehicle V is traveling at the position P2 of FIG. 4B. The overhead image (top view) 21A displayed on the left side of the screen of the display 21 includes an image (of boundary lines of parking spaces) that indicates the parking spaces PL2 to PL5 and PR2 to PR5. The center of the overhead image (top view) 21A is displayed with an icon of the subject vehicle V indicating the position of the subject vehicle V. The monitoring image (normal view) can be displayed as any of images captured by different cameras 1a to 1d in accordance with the operation state of the subject vehicle V. The example illustrated in FIG. 6A is displayed as an image captured by the camera 1a which is disposed on the front grill part of the subject vehicle V. When the subject vehicle V moves back, the monitoring image may be displayed as an image captured by the camera 1d which is disposed in the vicinity of the rear bumper. The image 21C is an image for messages.

As illustrated in FIG. 6A, parking spaces PL2, PL4, PL5, PR2, PR3, and PR5 are displayed with circles representing the available parking spaces Me, and the parking space PL4 is displayed with a dotted frame representing the recommended available parking space Mr. The parking spaces PL3 and PR4 are each displayed with an overhead image of a part of a vehicle. The driver and passengers of the subject vehicle can confirm the positions of the available parking spaces Me and the position of the recommended available parking space Mr from the display screen of the display 21. In addition, from the messages included in the image 21C, the driver and passengers can confirm that the automated driving mode is effective and the vehicle is required to stop for performing the automated driving.

Referring again to FIG. 2, in step S106, a determination is made as to whether or not a target parking space Mo is input. The target parking space Mo is a parking space into which the vehicle is parked by the automated driving, and represents a location to be the target in the automated driving. The target parking space Mo is set on the basis of the operation by the driver or a passenger. For example, when the display 21 is a touch panel-type display, the driver or a passenger touches a portion representing a desired parking space thereby to designate the target parking space Mo, and information on the target parking space Mo is input to the control device 10.

When the target parking space Mo is input, the control flow proceeds to step S107. On the other hand, when the target parking space Mo is not input, the control flow returns to step S104, and the control flow from step S104 to step S106 is repeatedly executed.

The control flow of the loop portion from step S104 to step S106 will be described. In the situation in which the subject vehicle V is traveling at the position P2 illustrated in FIG. 4B, when the target parking space Mo is not input, the position of the gaze point moves forward because the subject vehicle V is traveling.

Figure 4C:
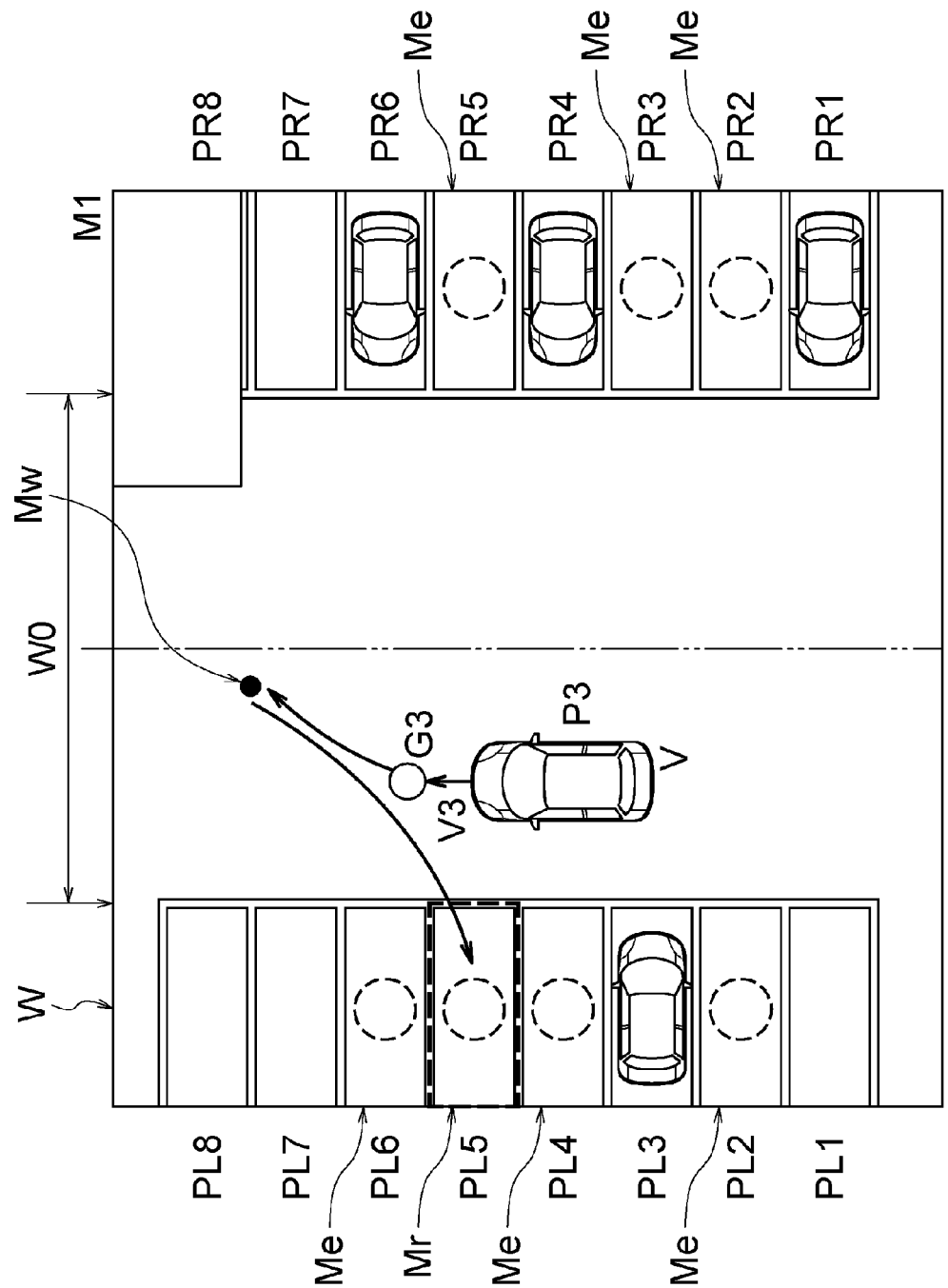
FIG. 4C is a third view for describing an example of the parking assist process according to one or more embodiments of the present invention.

FIG. 4C is a third view for describing an example of the parking assist process according to one or more embodiments of the present invention. As the subject vehicle V moves forward, the position of the gaze point moves from G2 to G3. When the position of the gaze point comes to G3, the recommended available parking space Mr changes from the parking space PL4 to the parking space PL5.

Figure 6B:
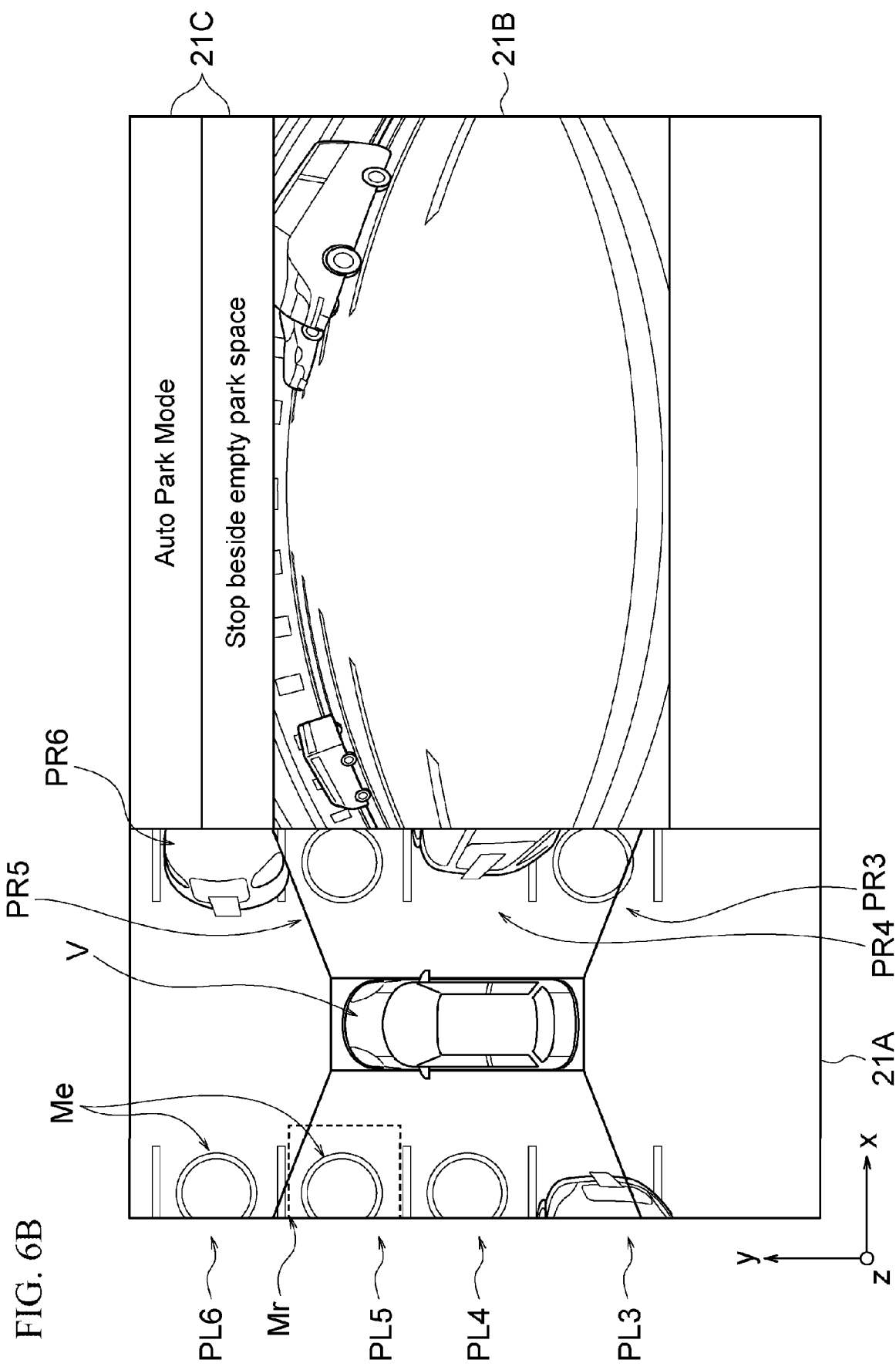
FIG. 6B is a second view for describing an example of a display screen in the parking assist process according to one or more embodiments of the present invention.

FIG. 6B is a second view for describing an example of a display screen in the parking assist process according to one or more embodiments of the present invention. The display screen of FIG. 6B is a display screen when the subject vehicle V is traveling at the position P3 of FIG. 3C. As illustrated in FIG. 6B, when the subject vehicle V is traveling forward, on the display screen of the display 21, the frame indicating the recommended available parking space Mr moves forward and changes to the parking space PL5 in accordance with the movement of the subject vehicle V.

Here, a display form of the recommended available parking space Mr when the subject V vehicle moves while decelerating will be described. As described above, the control device 10 sets the recommended available parking space Mr for the available parking space Me which is closest to the gaze point. The gaze point distance varies in accordance with the vehicle speed of the subject vehicle V.

The description will be made for a case in which the characteristic of the gaze point distance when the vehicle speed increases and the characteristic of the gaze point distance when the vehicle speed decreases follow the characteristic illustrated by the solid line of FIG. 5 rather than the hysteresis characteristic as illustrated in FIG. 5. It is assumed that, in the example of FIG. 4B, the recommended available parking space Mr set when the vehicle speed is Vd is the parking space PL5. In such a case, as the vehicle speed becomes lower than Vd from the state of Vd, the gaze point distance becomes shorter than Yb, and the recommended available parking space Mr therefore changes from the parking space PL5 to another parking space PL4. That is, despite the fact that the subject vehicle travels toward the recommended available parking space Mr which is set before deceleration, the screen of the display 21 shows a movement such that the frame of the recommended available parking space Mr returns below on the screen (in the direction opposite to the travel direction of the subject vehicle, i.e. in the negative direction of the y-axis of FIG. 6A). To prevent such unnatural movement of the recommended available parking space Mr, hysteresis is given to the characteristic of the gaze point distance with respect to the vehicle speed.

With the hysteresis characteristic, the gaze point distance is maintained at Yb when the vehicle speed becomes lower than Vd from the state of Vd. The recommended available parking space Mr therefore remains at the position of the parking space PL5 or moves to the parking space PL6 on the travel direction side of the vehicle from the position of the parking space PL5. This can prevent the unnatural movement of the recommended available parking space Mr.

Figure 6C:
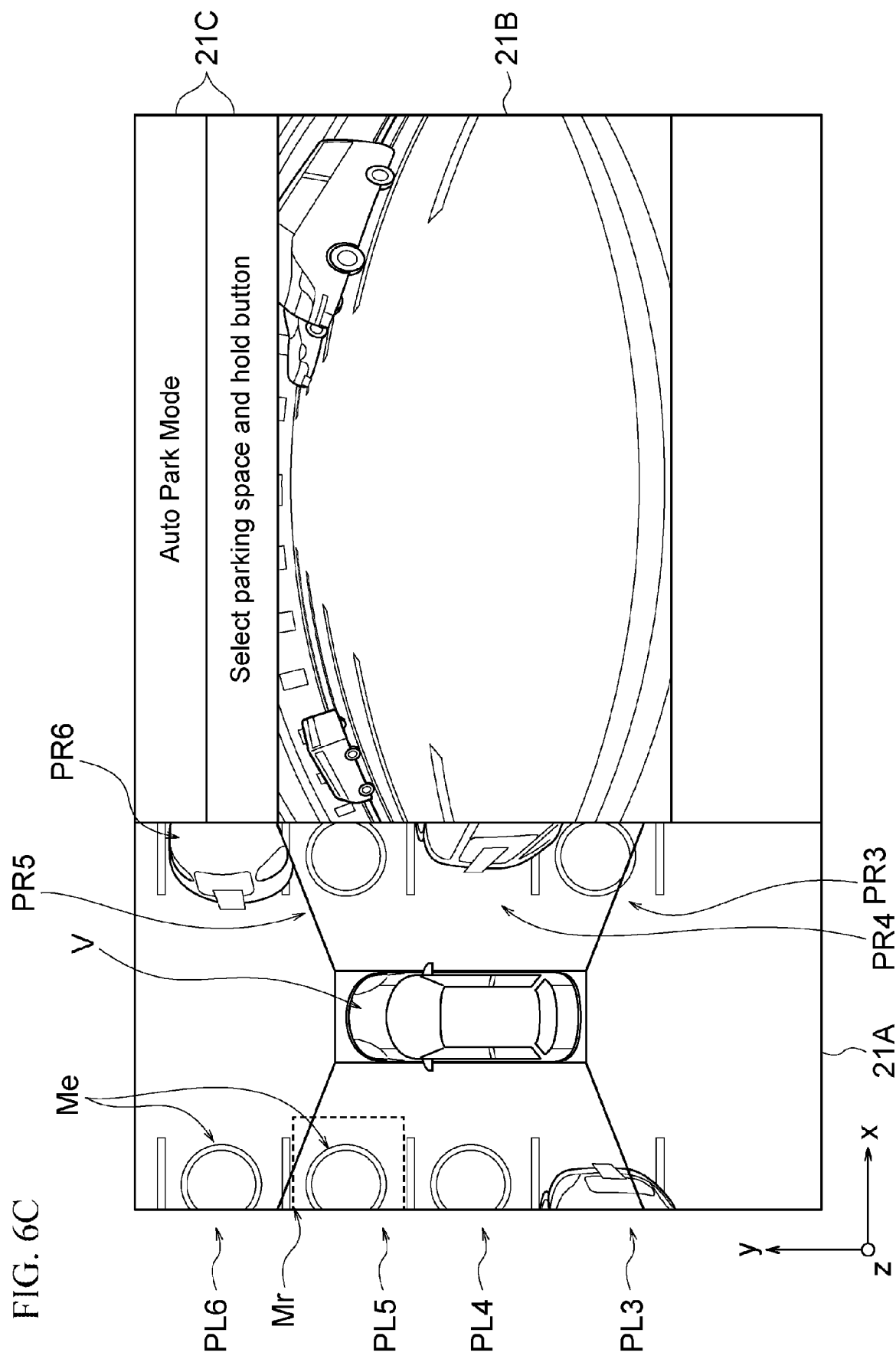
FIG. 6C is a third view for describing an example of a display screen in the parking assist process according to one or more embodiments of the present invention.

Referring again to FIG. 2, when the subject vehicle V stops while the control flow from step S104 to step S106 is repeatedly executed, the display screen of the display 21 becomes a screen as illustrated in FIG. 6C. FIG. 6C is a third view for describing an example of a display screen in the parking assist process according to one or more embodiments of the present invention. The display screen of FIG. 6C is a display screen when the subject vehicle V stops at the position P3 in FIG. 4C.

As illustrated in the display screen of FIG. 6C, the user finds the messages included in the image 21C and can confirm that selection and input of the target parking space Mo are required.

In step S107, the target parking space Mo is set and presented. In the example of FIG. 6C, the recommended available parking space Mr is displayed at the position of the parking space PL5. When, in this state, the driver or passenger touches the displayed portion of the recommended available parking space Mr, the control device 10 sets the parking space PL5 as the target parking space Mo.

Figure 4D:
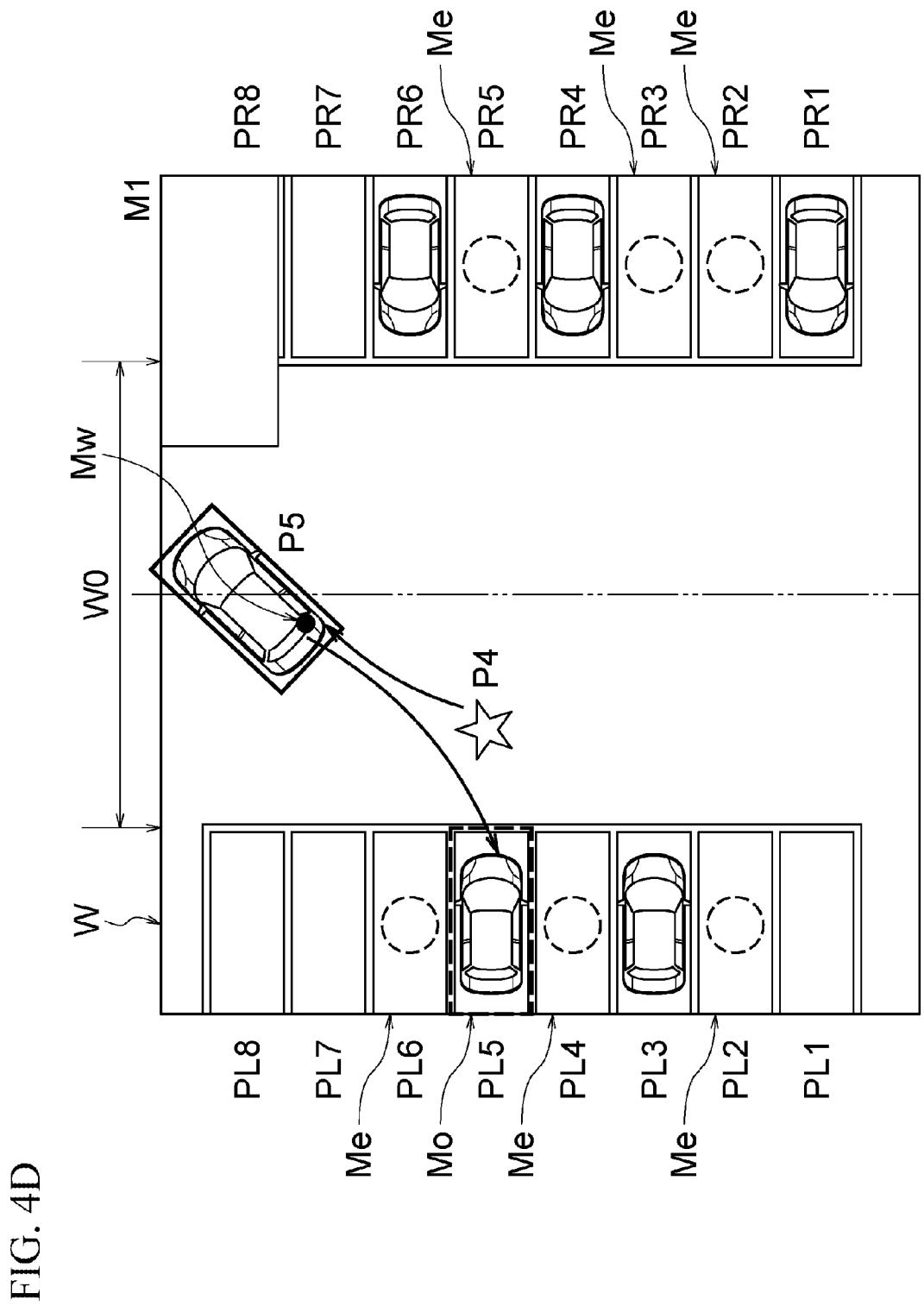
FIG. 4D is a fourth view for describing an example of the parking assist process according to one or more embodiments of the present invention.

FIG. 4D is a fourth view for describing an example of the parking assist process according to one or more embodiments of the present invention. FIG. 6D is a fourth view for describing an example of a display screen in the parking assist process according to one or more embodiments of the present invention. The display screen of FIG. 6D is a display screen when the vehicle stops at the position P4 in FIG. 4D. When the parking space PL5 is set as the target parking space Mo, the control device 10 controls the display 21 to display the display screen as illustrated in FIG. 6D thereby to present the target parking space Mo to the driver and passengers. The driver and passengers find the messages included in the image 21C and can confirm that the automated driving can be started.

Referring again to FIG. 2, in step S108, the control device 10 calculates a travel route for moving the subject vehicle to the target parking space Mo. The user designates the parking space PL5, which is presented as the recommended available parking space Mr as illustrated in FIG. 4C, as the target parking space Mo. The user touches the parking space PL5, which is displayed on the touch panel-type display 21, to designate this parking space as the target parking space Mo. Through this operation, the target parking space Mo is determined. As illustrated in FIG. 4D, the subject vehicle V moves to the position P4 on the side of the target parking space PL5 (Mo). This position P4 is the automated parking start position for the subject vehicle.

The control device 10 calculates a travel route on the basis of the positional relationship between the position P4 of the subject vehicle V at which the parking maneuver (movement) is started and the position of the target parking space Mo. Although not particularly limited, the control device 10 calculates the travel route to include two curves. The first curve lies from the stop position of the subject vehicle V, that is, the start position at which the parking assist is started, to the turning position P5 at which the turn for parking is performed. The second curve lies from the turning position P5 to the target parking space Mo. The control device 10 calculates the travel route corresponding to each of the right-angle parking, the parallel parking, and the angle parking illustrated in FIGS. 7A-7C, respectively. In one or more embodiments of the present invention, the travel route is calculated, but the present invention is not limited to this. In an alternative embodiment, a travel route corresponding to the type of the parking space is stored in a memory (ROM), and the travel route may be read out when parking. The parking mode (such as right-angle parking, parallel parking, and angle parking) may be selected by the user of the subject vehicle V.

The control device 10 reads travel routes corresponding to the selected parking mode and calculates a travel route on the basis of the relationship between the position of the subject vehicle V when starting the automated parking process and the position of the target parking space Mo. When the user presses the previously-described deadman switch under the automated parking mode, the control device 10 controls the vehicle controller 30 to execute the process of moving the subject vehicle to the target parking space Mo on the calculated travel route.

In step S109, the parking assist apparatus 100 according to one or more embodiments of the present invention executes the parking assist process or the automated parking process. The parking assist apparatus 100 according to one or more embodiments of the present invention controls the operation of the drive system 40 via the vehicle controller 30 so that the subject vehicle moves along the travel route.

FIG. 6E is a fifth view for describing an example of a display screen in the parking assist process according to one or more embodiments of the present invention. When the automated driving is started, the display screen of the display 21 becomes a screen as illustrated in FIG. 6E, and the subject vehicle V moves forward. At this time, the image 21C is displayed with messages informing that the subject vehicle V is moving forward by the automated driving and that the driver and passengers should gaze around the subject vehicle V. The automated driving control executed by the parking assist apparatus 100 will be described below.

The parking assist apparatus 100 calculates command signals to the drive system 40 of the subject vehicle, such as an EPS motor, while feeding back the output value of the steering angle sensor 50 of the steering apparatus so that the travel trajectory of the subject vehicle V coincides with the calculated travel route, and sends the command signals to the drive system 40 or to the vehicle controller 30 which controls the drive system 40.

The parking assist apparatus 100 according to one or more embodiments of the present invention includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the vehicle and the vehicle speed sensor 60 and other sensors of the vehicle, via the vehicle controller 30.

The drive system 40 according to one or more embodiments of the present invention allows the subject vehicle V to park into the target parking space Mo by driving based on the control command signals acquired from the parking assist apparatus 100. The steering apparatus according to one or more embodiments of the present invention is a drive mechanism that moves the subject vehicle V in the right and left directions. The EPS motor included in the drive system 40 drives the power steering mechanism of the steering apparatus on the basis of the control command signals acquired from the parking assist apparatus 100 to control the steering amount and assists the operation when moving the subject vehicle V to the target parking space Mo. The content of the parking assist and the scheme of operation are not particularly limited, and schemes known at the time of filing of this application can be appropriately applied.

As illustrated in FIG. 4D, when the parking assist apparatus 100 according to one or more embodiments of the present invention controls the subject vehicle V to move to the target parking space Mo along the travel route calculated based on the movement start position P3 of the subject vehicle V and the position of the target parking space Mo, the operation of the accelerator/brake is automatically controlled on the basis of the designated control vehicle speed (set vehicle speed), and the steering operation of the steering apparatus is also automatically controlled in accordance with the vehicle speed. That is, during the parking assist according to one or more embodiments of the present invention, the steering operation of the steering apparatus and the accelerator/brake operation are automatically performed. It is also possible to perform a parking process by remote control that includes transmitting a setting command for the target parking space Mo, a parking process start command, a parking suspension command, etc. to the vehicle with no driver therein from the outside and performing the parking.

As will be understood, it is also possible for the user to operate the accelerator/brake, and only the steering operation is automated. In this case, the parking assist apparatus 100 controls the drive system 40 on the basis of the set vehicle speed, which is preliminarily calculated, and controls the steering apparatus of the vehicle on the basis of the set steering angle, which is also preliminarily calculated, so that the subject vehicle V follows the travel route G2, G3 to move.

The above is the basic control content in the parking assist apparatus 100 according to one or more embodiments of the present invention.

Figure 8:
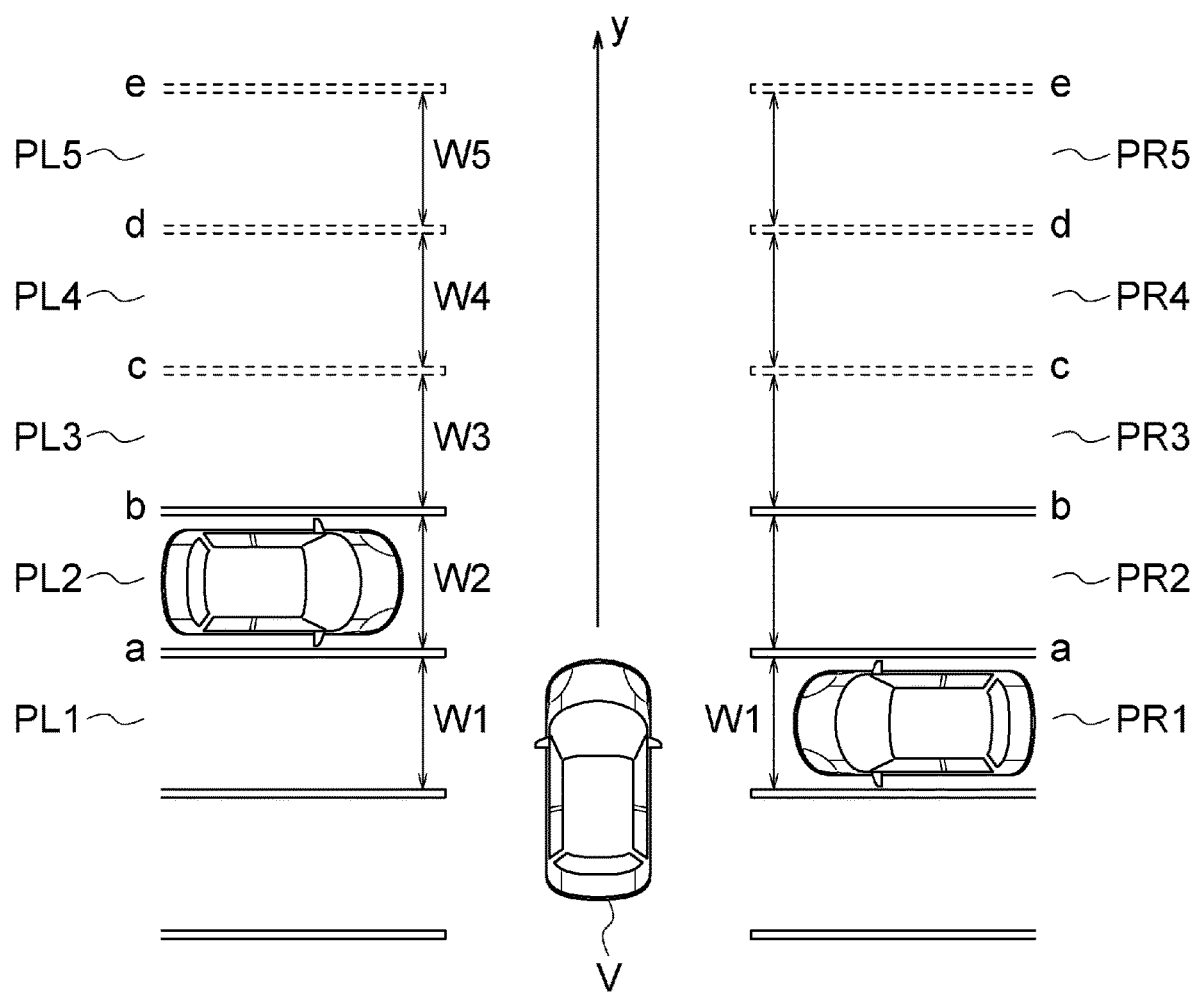
FIG. 8 is a view illustrating an example of an overhead image in the parking assist apparatus according to one or more embodiments of the present invention.

As illustrated in FIG. 8, the control device 10 analyzes the overhead image, which is generated from the images captured by the cameras 1a to 1d, thereby to detect parking spaces PLn (n is an integer) and PRn (n is an integer). In such an overhead image, as the distance from the subject vehicle becomes longer, the resolution of the overhead image lowers and the detection accuracy of frame lines deteriorates. The same situation occurs when the road surface of a parking lot inclines, for example, when the road surface inclines such that the height level decreases gradually from the pathway of the parking lot to the parking spaces PLn and PRn on the both sides.

In one or more embodiments of the present invention, therefore, the detection process for frame lines of the parking spaces PLn and PRn is executed using the following method. In the following description, only the detection process for frame lines of the left-side parking spaces PLn illustrated in FIG. 8 will be described, but the detection process for frame lines of the right-side parking spaces PRn illustrated in FIG. 8 is also executed in the same manner.

Figure 9:
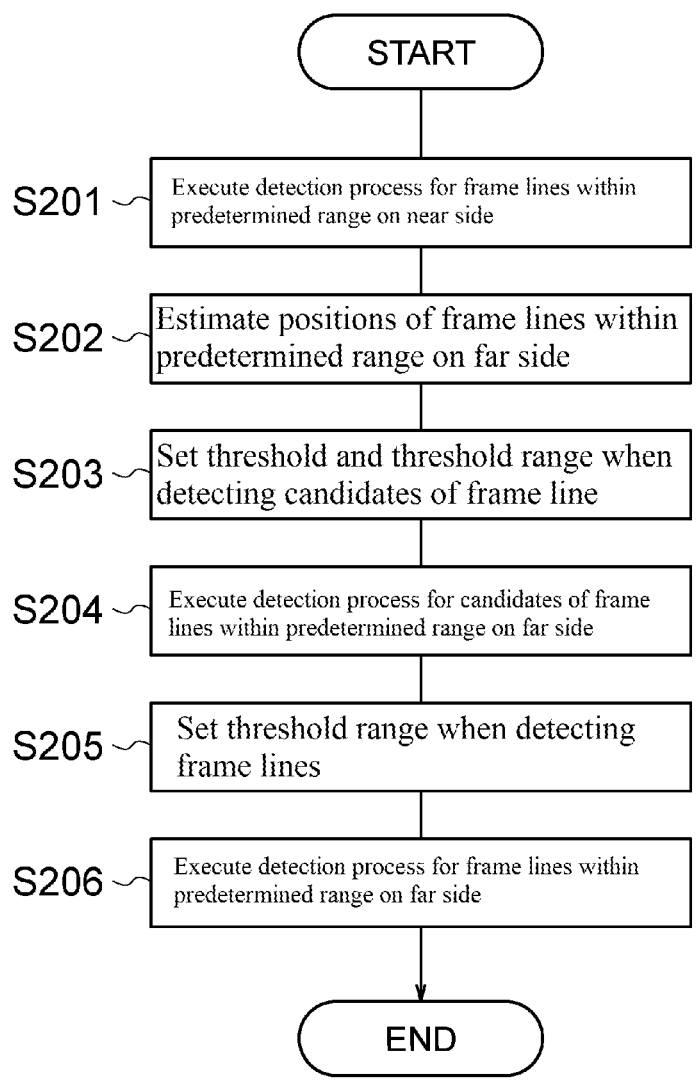
FIG. 9 is a flowchart illustrating the procedure of a frame line detection process for parking spaces executed by the control device of the parking assist apparatus according to one or more embodiments of the present invention.

FIG. 9 is a flowchart illustrating a procedure of the frame line detection process for parking spaces executed by the control device 10. First, in step S201, the control device 10 executes the frame line detection process for the parking spaces PLn within a predetermined range on the near side in the vehicle travel direction in the overhead image. In this step, the control device 10 determines whether or not a pixel array exists in which the luminance difference between each pixel and its adjacent pixel is not less than a first threshold and the length of the pixel array falls within a first threshold range, and detects a line defined by the pixel array satisfying the conditions as a candidate of the frame line of each parking space PLn. Then, the control device 10 selects, from among the detected candidates of frame lines, a pair of frame line candidates in which the distance therebetween falls within a first threshold range and the relative angle therebetween falls within a first threshold range, and detects the pair of frame line candidates as the frame lines of the parking space PLn.

Step S201 is followed by step S202 in which the control device 10 estimates the positions of frame lines of parking spaces PL3, PL4, and PL5 that exist within a predetermined range on the far side in the vehicle travel direction (arrow y-direction of FIG. 8) in the overhead image, on the basis of the positions of frame lines of parking spaces PL1 and PL2 detected from the predetermined range on the near side in the vehicle travel direction in the overhead image. In this step, the lateral widths W3, W4, and W5 of the undetected parking spaces PL3, PL4, and PL5 are estimated as the average value of the lateral widths W1 and W2 of the detected parking spaces PL1 and PL2 or as one of the lateral widths W1 and W2. Then, a position c separate by a distance W3 from the position b of the frame line on the farthest side in the vehicle travel direction among the detected frame lines, a position d separate from the position c toward the far side in the vehicle travel direction by a distance W4, and a position e separate from the position d toward the far side in the vehicle travel direction by a distance W5 are estimated as the positions of frame lines. In the above description, the lateral widths of the parking spaces PLn are calculated from the overhead image, but the present invention is not limited to this. In an alternative embodiment, some information may be acquired from an external server to perceive the lateral widths. When the lateral widths are perceived from the information acquired from the external, the lateral widths can be used to estimate the positions of frame lines on the far side in the vehicle travel direction.

Step S202 is followed by step S203 in which the control device 10 sets a threshold value for each parameter for detecting candidates of frame lines of the parking spaces PL3, PL4, and PL5 from the predetermined range on the far side in the vehicle travel direction in the overhead image. Here, examples of the parameter for detecting candidates of frame lines include the length of a pixel array in which the luminance difference between each pixel and its adjacent pixel is a predetermined value or more.

Figure 10:
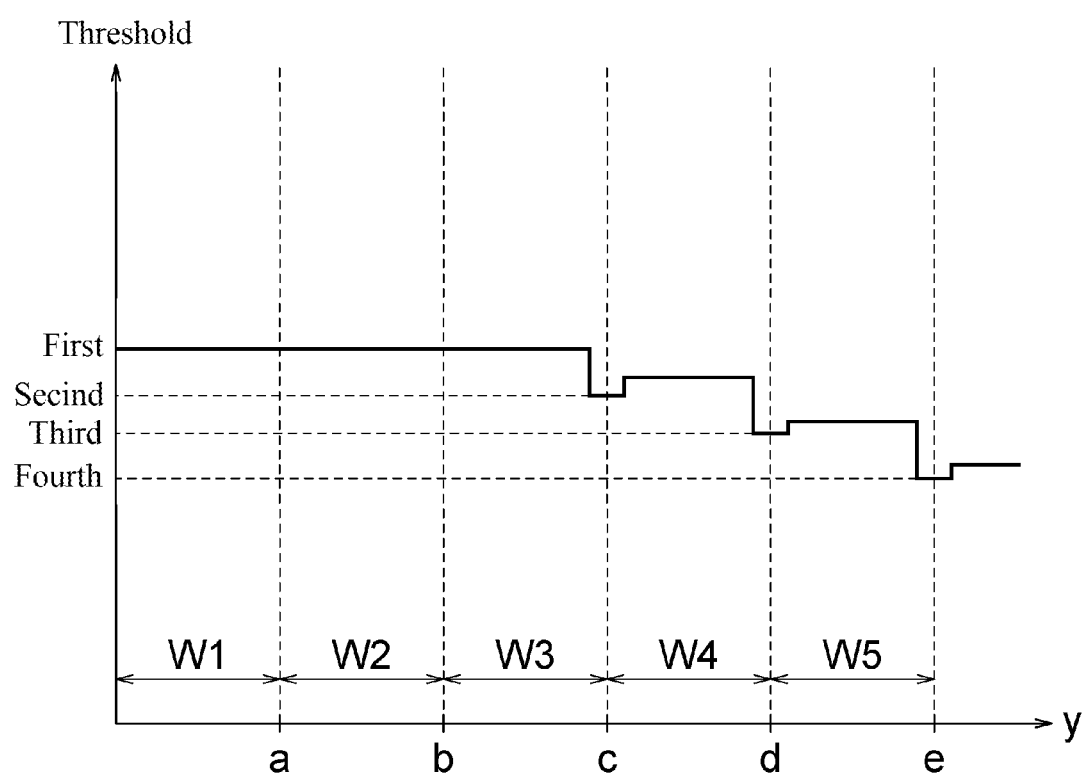
FIG. 10 is a chart illustrating the relationship between the position in the travel direction of the vehicle and the threshold used for detection of frame line candidates.

FIG. 10 is a chart illustrating the relationship between the position in the travel direction of the vehicle and the threshold used for detection of frame line candidates. As illustrated in the chart, in this step, the threshold of the luminance difference in the region with a width H1 around the position c estimated in step S202 is set to a second threshold lower than the above first threshold. The threshold of the luminance difference in the region with the width H1 around the position d estimated in step S202 is set to a third threshold lower than the second threshold. The threshold of the luminance difference in the region with the width H1 around the position e estimated in step S202 is set to a fourth threshold lower than the third threshold. Here, the width H1 for setting the second to fourth thresholds at the positions c, d, and e is set to be larger than the width of a conceivable average frame line. As will be understood, setting the threshold of the luminance difference to the second threshold lower than the first threshold is to widen the threshold range. This also applies to other parameters, and the threshold is changed to widen the threshold range so that the frame lines and/or frame line candidates can be readily detected.

The threshold of the luminance difference in the region between the position c and the position d is set to a threshold lower than the first threshold and higher than the second threshold, and the threshold of the luminance difference in the region between the position d and the position e is set to a threshold lower than the second threshold and higher than the third threshold. The threshold of the luminance difference in the region on the farther side than the position e in the vehicle travel direction is set to a detection threshold lower than the third threshold and higher than the fourth threshold.

Figure 11:
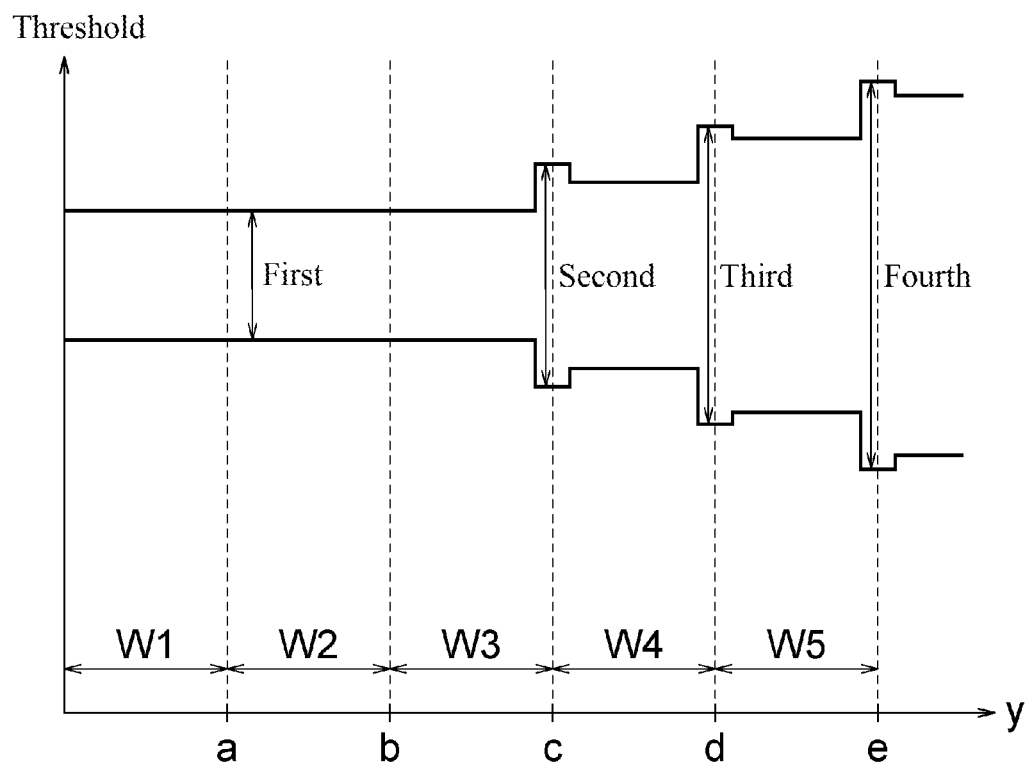
FIG. 11 is a chart illustrating the relationship between the position in the travel direction of the vehicle and the threshold used for detection of frame line candidates.

FIG. 11 is a chart illustrating the relationship between the position in the travel direction of the vehicle and the threshold range used for detection of frame line candidates. As illustrated in the chart, the threshold range of the length in the region with the width H1 around the position c estimated in step S202 is set to a second threshold range wider than the first threshold range. The threshold range of the length in the region with the width H1 around the position d estimated in step S202 is set to a third threshold range wider than the second threshold range. The threshold range of the length in the region with the width H1 around the position e estimated in step S202 is set to a fourth threshold range wider than the third threshold range.

The threshold range of the length in the region between the position c and the position d is set to a threshold range wider than the first threshold range and narrower than the second threshold range, and the threshold range of the length in the region between the position d and the position e is set to a threshold range wider than the second threshold range and narrower than the third threshold range. The threshold range of the length in the region on the farther side than the position e in the vehicle travel direction is set to a threshold range wider than the third threshold range and narrower than the fourth threshold range.

Referring again to FIG. 9, in step S204, the control device 10 executes the detection process for candidate frame lines within a predetermined range on the far side in the vehicle travel direction in the overhead image. In this step, for the region with the width H1 around the position c, a determination is made as to whether or not a pixel array exists in which the luminance difference between each pixel and its adjacent pixel is not less than the second threshold and the length of the pixel array falls within the second threshold range, and when the conditions are satisfied, a frame line candidate is detected from the region. For the region with the width H1 around the position d, a determination is made as to whether or not a pixel array exists in which the luminance difference between each pixel and its adjacent pixel is not less than the third threshold and the length of the pixel array falls within the third threshold range, and when the conditions are satisfied, a frame line candidate is detected from the region. For the region with the width H1 around the position e, a determination is made as to whether or not a pixel array exists in which the luminance difference between each pixel and its adjacent pixel is not less than the fourth threshold and the length of the pixel array falls within the fourth threshold range, and when the conditions are satisfied, a frame line candidate is detected from the region.

Step S204 is followed by step S205 in which the control device 10 sets threshold ranges used for detecting the frame line candidates detected in step S204 as the frame lines of the parking spaces PL3, PL4, and PL5. In this step, the threshold range of the distance between the frame line candidate detected from the region with the width H1 around the position c and the frame line candidate detected from the region with the width H1 around the position b is set to a second threshold range wider than the above first threshold range. The threshold range of the distance between the frame line candidate detected from the region with the width H1 around the position d and the frame line candidate detected from the region with the width H1 around the position c is set to a third threshold range wider than the above second threshold range. The threshold range of the distance between the frame line candidate detected from the region with the width H1 around the position e and the frame line candidate detected from the region with the width H1 around the position d is set to a fourth threshold range wider than the above third threshold range.

In addition, in this step, the threshold range of the relative angle between the frame line candidate detected from the region with the width H1 around the position c and the frame line candidate detected from the region with the width H1 around the position b is set to a second threshold range wider than the above first threshold range. The threshold range of the relative angle between the frame line candidate detected from the region with the width H1 around the position d and the frame line candidate detected from the region with the width H1 around the position c is set to a third threshold range wider than the above second threshold range. The threshold range of the relative angle between the frame line candidate detected from the region with the width H1 around the position e and the frame line candidate detected from the region with the width H1 around the position d is set to a fourth threshold range wider than the above third threshold range.

Step S205 is followed by step S206 in which, for a predetermined range on the far side in the vehicle travel direction in the overhead image, the control device 10 executes the process of detecting the candidate frame lines as the frame lines of the parking spaces PL3, PL4, and PL5. In this step, a determination is made as to whether or not the distance between the frame line candidate detected from the region with the width H1 around the position c and the frame line candidate detected from the region with the width H1 around the position b falls within the distance's second threshold range and the relative angle between the frame line candidate detected from the region with the width H1 around the position c and the frame line candidate detected from the region with the width H1 around the position b falls within the relative angle's second threshold range. When the conditions are satisfied, the frame line candidate detected from the region with the width H1 around the position c is detected as the frame line on the far side of the parking space PL3. In addition, a determination is made as to whether or not the distance between the frame line candidate detected from the region with the width H1 around the position d and the frame line candidate detected from the region with the width H1 around the position c falls within the distance's third threshold range and the relative angle between the frame line candidate detected from the region with the width H1 around the position d and the frame line candidate detected from the region with the width H1 around the position c falls within the relative angle's third threshold range. When the conditions are satisfied, the frame line candidate detected from the region with the width H1 around the position d is detected as the frame line on the far side of the parking space PL4. Further, a determination is made as to whether or not the distance between the frame line candidate detected from the region with the width H1 around the position e and the frame line candidate detected from the region with the width H1 around the position d falls within the distance's fourth threshold range and the relative angle between the frame line candidate detected from the region with the width H1 around the position e and the frame line candidate detected from the region with the width H1 around the position d falls within the relative angle's fourth threshold range. When the conditions are satisfied, the frame line candidate detected from the region with the width H1 around the position e is detected as the frame line on the far side of the parking space PL5.

In the above description, the frame line candidate is extracted on the basis of the luminance difference between a pixel array and its adjacent pixel array and the length of the pixel array, and thereafter the frame line is detected on the basis of the relative angle between frame lines and the distance between frame lines, but one or more embodiments of the present invention are not limited to this. For example, the frame line candidate may be extracted on the basis of the relative angle between frame lines and the distance between frame lines, and thereafter the frame line may be detected on the basis of the luminance difference between a pixel array and its adjacent pixel array and the length of the pixel array. Besides the luminance difference between a pixel array and its adjacent pixel array, the length of the pixel array, the relative angle between frame lines, and the distance between frame lines, factors of a white line width and the perpendicularity to the pathway may be employed to extract candidates of frame lines and/or detect frame lines. When the candidates of frame lines are extracted and/or the frame lines are detected, parameters and the combination thereof are not limited at all. When the candidates of frame lines are extracted and/or the frame lines are detected using each parameter, changing the threshold (lowering the threshold) corresponds to widening the threshold range.

In addition, the frame lines in the above description are not necessarily limited to straight lines, and the present invention can be applied to a case of dotted lines and a case in which straight lines are broken. In such cases of dotted lines and broken straight lines, positions with frame lines may be limited for detection and extraction, or positions without frame lines may be complemented to assume straight lines using information on positions at which frame lines exist.

The parking assist apparatus 100 according to one or more embodiments of the present invention is configured and operates as the above and therefore has the following effects.

When the value of a parameter (such as the length of a pixel array in which the luminance difference between each pixel and its adjacent pixel is a predetermined value or more) used for detection of frame lines of parking spaces PLn falls within a first threshold range, the control device 10 of the parking assist apparatus 100 according to one or more embodiments of the present invention detects the frame lines of the parking spaces PL1 and PL2 from a predetermined range on the near side in the vehicle travel direction. Then, the control device 10 estimates the positions of frame lines of undetected parking spaces PL3, PL4, and PL5 on the basis of the positions of the detected frame lines. The undetected parking spaces PL3, PL4, and PL5 are located within a predetermined range on the far side in the vehicle travel direction. Here, the control device 10 sets the threshold ranges of the value of the parameter, which are used for detecting frame lines of the parking spaces PL3, PL4, and PL5 at the estimated positions of frame lines in the predetermined range on the far side in the vehicle travel direction, to the second to fourth threshold ranges which are wider than the above first threshold range.

This can avoid the situation in which, as the distance from the subject vehicle V increases, the resolution of the captured image lowers to make it difficult to detect frame lines. The possibility that frame lines of parking spaces can be detected, therefore, increases.

Moreover, as the distance between the estimated position of the frame line of each parking space PLn and the subject vehicle V increases, the control device 10 of the parking assist apparatus 100 according to one or more embodiments of the present invention sets the threshold range of the value of the parameter, which is used for detecting the frame line of the parking space PLn at the estimated position, to gradually widen in the order of the second threshold range, the third threshold range, and the fourth threshold range.

That is, for each estimated position, an appropriate threshold range is set in accordance with the distance from the subject vehicle V to the estimated position. This can more enhance the possibility that the frame line of each parking space PLn can be detected.

A modified example of the setting method for detection thresholds will then be described. Repetitive description of the same matters as in the above-described embodiments is omitted, and the description made in the above-described embodiments is borrowed herein.

Figure 12:
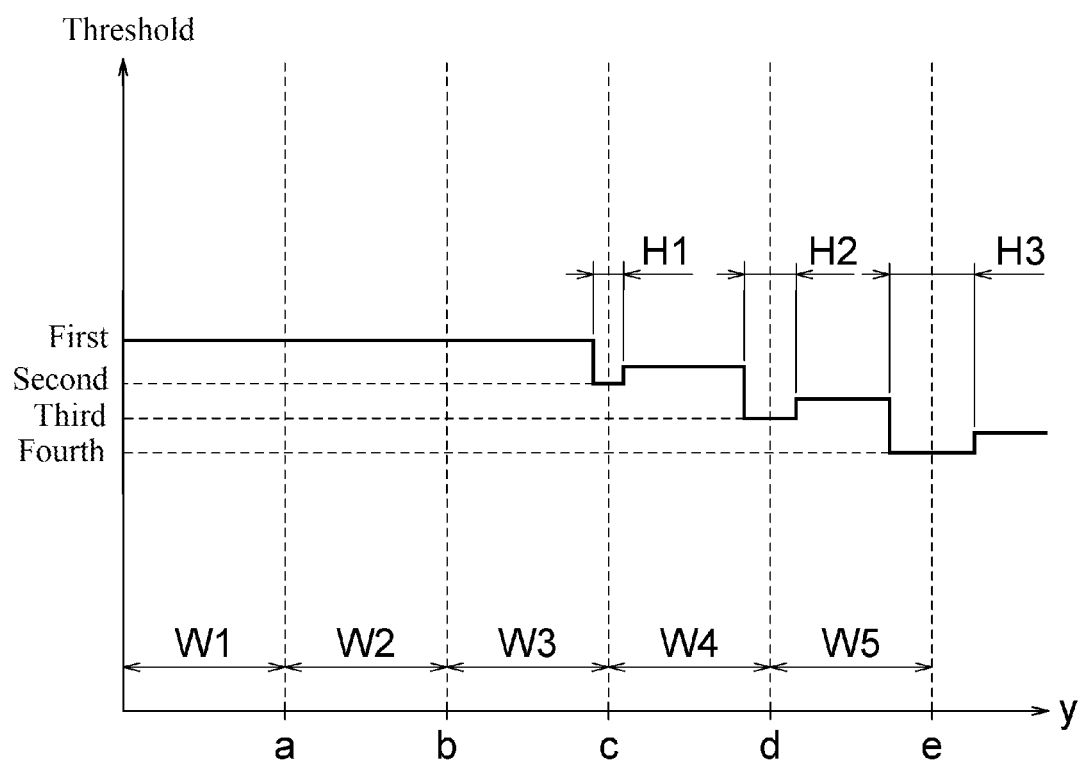
FIG. 12 is a chart illustrating the relationship between the position in the travel direction of the vehicle and the threshold used for detection of frame line candidates.

FIG. 12 is a chart illustrating the relationship between the position in the travel direction of the vehicle and the threshold used for detection of frame line candidates. As illustrated in the chart, the threshold of the luminance difference in the region with a width H1 around the position c is set to a second threshold lower than the above first threshold. The threshold of the luminance difference in the region with a width H2 around the position d is set to a third threshold lower than the second threshold. The threshold of the luminance difference in the region with a width H3 around the position e is set to a fourth threshold lower than the third threshold.

Here, the width H1 of the region in which the second threshold is set at the position c, the width H2 of the region in which the third threshold is set at the position d, and the width H3 of the region in which the fourth threshold is set at the position e satisfy the relationship of the following formula (1).

$$H1<H2<H3 \quad (1)$$

In the setting method for the thresholds of this example, as the distance from the subject vehicle increases in the order of the estimated positions c, d, and e, the widths of the regions for setting the second to fourth thresholds are set to gradually increase in the order of H1, H2, and H3. That is, for each estimated position, an appropriate width of the region in which the threshold is reduced is set in accordance with the distance from the subject vehicle V to the estimated position. This can furthermore enhance the possibility that the frame line of each parking space can be detected.

The "control device 10" in the above-described embodiments corresponds to examples of the "frame line detector," the "estimator," and the "threshold setting device" in the present invention. The "camera 1" in the above described embodiments corresponds to an example of the "image capture device" in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the present invention is described with reference to an example of the detection process for frame lines of the parking spaces PLn and PRn in the right-angle parking scheme, but the present invention can also be applied to the frame line detection process for parking spaces in the parallel parking scheme (see FIG. 7B) and parking spaces in the angle parking scheme (see FIG. 7C).

Moreover, the setting method for detection thresholds as described in the above-described embodiments and the modified example of the setting method for detection thresholds may be combined. That is, the detection thresholds may be set such that, as the distance between the subject vehicle V and the estimated position of the frame line increases, the threshold range gradually widens and the width of the region in which the threshold range is widened gradually widens.

Furthermore, the above-described embodiments are described on the assumption of the existence of one or more cameras provided on the vehicle, but the present invention is not limited to this. In one or more embodiments of the present invention, a fixed camera provided in a parking lot, a camera of another vehicle, or a portable camera carried by the user may also be employed. In such a case, information on a parking space may be acquired from the outside to perceive the parking state of the parking space.

REFERENCE SIGNS LIST

1 Camera
10 Control device

The invention claimed is:

1. A method of detecting a frame line of a parking space from a captured image acquired by an image capture device, comprising:
   detecting a frame line of one parking space when a value of a parameter used for detection of the frame line of the one parking space falls within a first threshold range from a first minimum value to a first maximum value;
   estimating a position of an undetected frame line of another parking space on a basis of a position of the detected frame line of the one parking space;
   setting a threshold range of the value of the parameter to a second threshold range from a second minimum value to a second maximum value wider than the first threshold range, the threshold range being used for detecting the frame line of the another parking space at the estimated position of the frame line of the another parking space, the second minimum value being less than the first minimum value, the second maximum value being more than the first maximum value, the frame line of the another parking space comprising a plurality of frame lines, the estimated position comprising a plurality of estimated positions; and
   setting the second threshold range so as to widen for each of the estimated positions of the frame lines of the another parking space as a distance between the estimated position of the frame line of the another parking space and the image capture device increases.

2. The method according to claim 1, wherein when a first estimated position and a second estimated position each exist as the estimated position of the frame line of the another parking space, the second estimated position being located adjacent to the first estimated position and on a far side of the first estimated position with reference to the image capture device,
   the second threshold range at the first estimated position is set narrower than the second threshold range at the second estimated position, and
   the first threshold range at a position between the first estimated position and the second estimated position is set narrower than the second threshold range at the first estimated position and the second estimated position.

3. The method according to claim 1, wherein
   the parameter is a length of a pixel array in which a luminance difference between each pixel and its adjacent pixel is a predetermined value or more,
   the method comprising:
   detecting a frame line of the one parking space when the length of the pixel array in which the luminance difference between each pixel and its adjacent pixel is a first threshold or more falls within the first threshold range;
   estimating the position of the undetected frame line of the another parking space on the basis of the position of the detected frame line of the one parking space;
   setting the threshold range of the length of the pixel array to the second threshold range wider than the first threshold range; and
   setting the second threshold range so as to widen for each of the estimated positions of the frame lines of the another parking space as the distance between the estimated position of the frame line of the another parking space and the image capture device increases.

4. A method of detecting a frame line of a parking space from a captured image acquired by an image capture device, comprising:
   detecting a frame line of one parking space when a value of a parameter used for detection of the frame line of the one parking space falls within a first threshold range;
   estimating a position of an undetected frame line of another parking space on a basis of a position of the detected frame line of the one parking space;
   setting a threshold range of the value of the parameter to a second threshold range wider than the first threshold range, the threshold range being used for detecting the frame line of the another parking space at the estimated position of the frame line of the another parking space; and
   setting a width of a region in which the second threshold range is set, so as to widen as a distance between the estimated position of the frame line of the another parking space and the image capture device increases.

5. The method according to claim 3, wherein
   when a first estimated position and a second estimated position each exist as the estimated position of the frame line of the another parking space, the second estimated position being located adjacent to the first estimated position and on a far side of the first estimated position with reference to the image capture device,
   the second threshold range at the first estimated position is set narrower than the second threshold range at the second estimated position, and
   the first threshold range at a position between the first estimated position and the second estimated position is set narrower than the second threshold range at the first estimated position and the second estimated position.

6. A device for detecting a frame line of a parking space from captured information acquired by an image capture device, comprising:
   a frame line detector configured to detect a frame line of one parking space when a value of a parameter used for detection of the frame line of the one parking space falls within a first threshold range from a minimum value to a first maximum value;
   an estimator configured to estimate a position of an undetected frame line of another parking space on a basis of a position of the frame line of the one parking space detected by the frame line detector; and
   a threshold setting device configured to set a threshold range of the value of the parameter to a second threshold range from a second minimum value to a second maximum value wider than the first threshold range, the threshold range being used for detecting the frame line of the another parking space at the position of the frame line of the another parking space estimated by the estimator,
   wherein the frame line of the another parking space comprises a plurality of frame lines and the estimated position comprises a plurality of estimated positions,
   wherein the threshold setting device sets the second threshold range so as to widen for each of the estimated positions of the frame lines of the another parking space as a distance between the estimated position of the frame line of the another parking space and the image capture device increases.

* * * * *